United States Patent [19]

Chovan et al.

[11] Patent Number: 4,974,920

[45] Date of Patent: Dec. 4, 1990

[54] ELECTRONIC HOLOGRAPHIC APPARATUS

[75] Inventors: Joseph Chovan, North Syracuse; William A. Penn, Baldwinsville; Jerome J. Tiemann, Schenectady; William E. Engeler, Scotia, all of N.Y.

[73] Assignee: General Electric Company, Syracuse, N.Y.

[21] Appl. No.: 338,881

[22] Filed: Apr. 17, 1989

[51] Int. Cl.$^5$ .................... G03H 1/16; G03H 1/02
[52] U.S. Cl. ............................ 350/3.61; 350/3.6; 350/3.82
[58] Field of Search ............... 350/3.63, 3.61, 3.6, 350/3.82; 356/347; 364/822, 827

[56] References Cited

U.S. PATENT DOCUMENTS

| | | | |
|---|---|---|---|
| 3,649,754 | 4/1972 | Macovski | 350/3.6 X |
| 3,735,036 | 5/1973 | Macovski | 350/3.6 X |
| 3,828,126 | 8/1974 | Ramsey, Jr. | 350/3.6 X |
| 3,982,835 | 9/1976 | Schwomma | 350/3.6 X |
| 4,011,442 | 3/1977 | Engeler | 365/114 |
| 4,084,257 | 4/1978 | Burke et al. | 365/45 |
| 4,097,749 | 6/1978 | Gardner | 350/162.12 X |
| 4,241,421 | 12/1980 | Burke et al. | 365/183 |
| 4,798,466 | 1/1989 | Bouteyre et al. | 356/347 |

OTHER PUBLICATIONS

"Laser Speckle and Related Phenomena", edited by J. C. Dainty w/contributions by J. C. Dainty, A. E. Ennos, M. Francon, J. W. Goodman, T. S. McKechnie and G. Parry-vol. 9 of Topics in Applied Physics/Springer-Verlag, 1984, pp. 232-236.

*Primary Examiner*—Bruce Y. Arnold
*Assistant Examiner*—David R. Parsons
*Attorney, Agent, or Firm*—Richard V. Lang; Paul J. Checkovich; Fred Jacob

[57] ABSTRACT

The invention relates to holography and more particularly to an electronic holographic apparatus whose electrical output represents the magnitude and phase of coherent light reflected from a three-dimensional object and distributed over the aperture of the apparatus. The apparatus provides a coherent beam which illuminates the object to create a speckle pattern in an aperture bounding an optical sensing arrangement. A reference beam derived from the same source as the illuminating beam illuminates the sensing aperture directly and creates fringes in the speckle pattern. The optical sensing arrangement consists of a charge injection device (CID) camera with plural optical detectors arranged in relation to the speckle pattern to sense the magnitude and spatial phase of each speckle (on the average). The sampled outputs of the CID detectors are processed to isolate the magnitude and phase information representing the complex optical wavefront of the hologram from irrelevent terms created by the interference process. The detected information may be used for such purposes as imaging, interferometry, matched filtering or correlation.

31 Claims, 10 Drawing Sheets

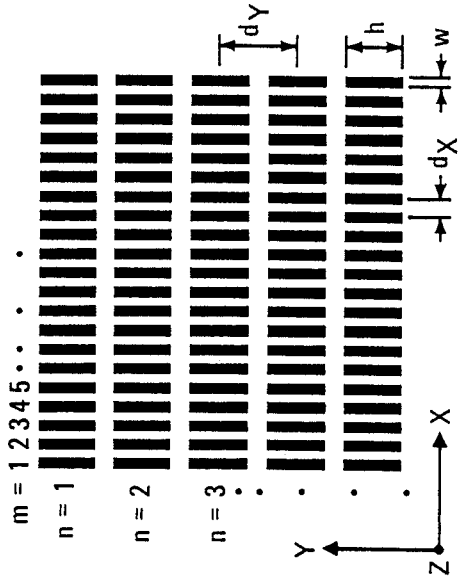
FIG. 1B SPECKLE OPTICAL PATTERN
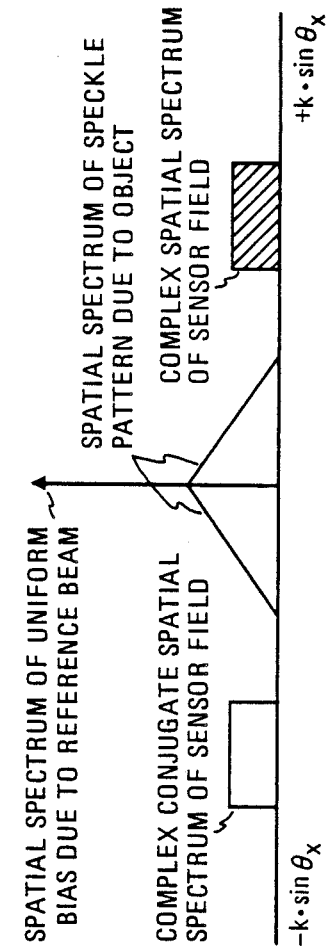
FIG. 1C SENSOR PATTERN
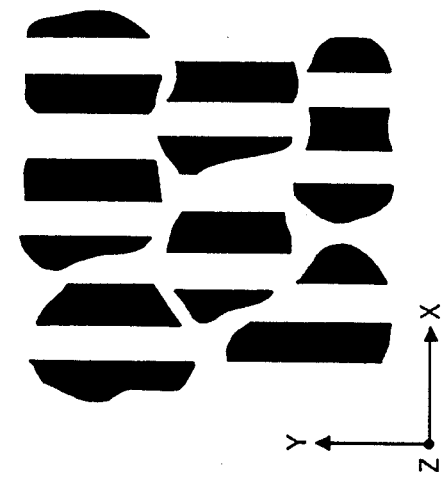
FIG. 2
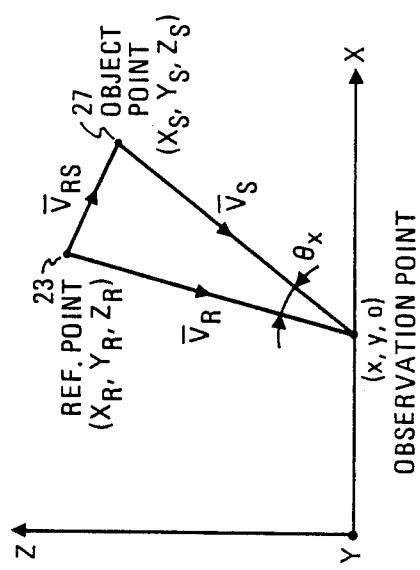
FIG. 3 SPATIAL FREQUENCY SPECTRUM IN x DIRECTION OF INTENSITY DISTRIBUTION IN RECEIVE APERTURE

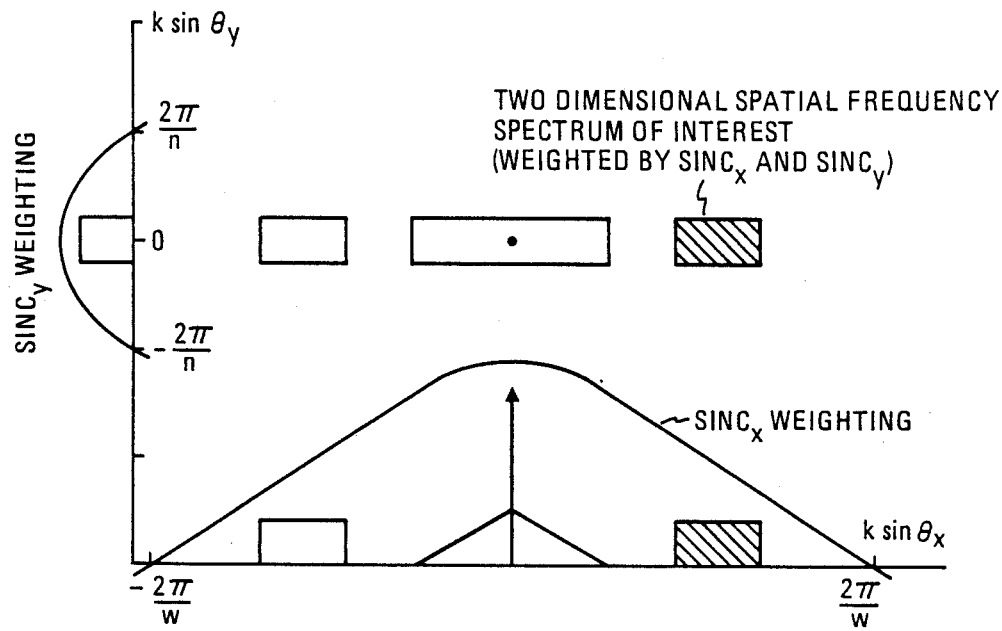
FIG. 4 ANGULAR ANTENNA WEIGHTING PATTERN DUE TO FINITE AREA OF SENSING CELLS
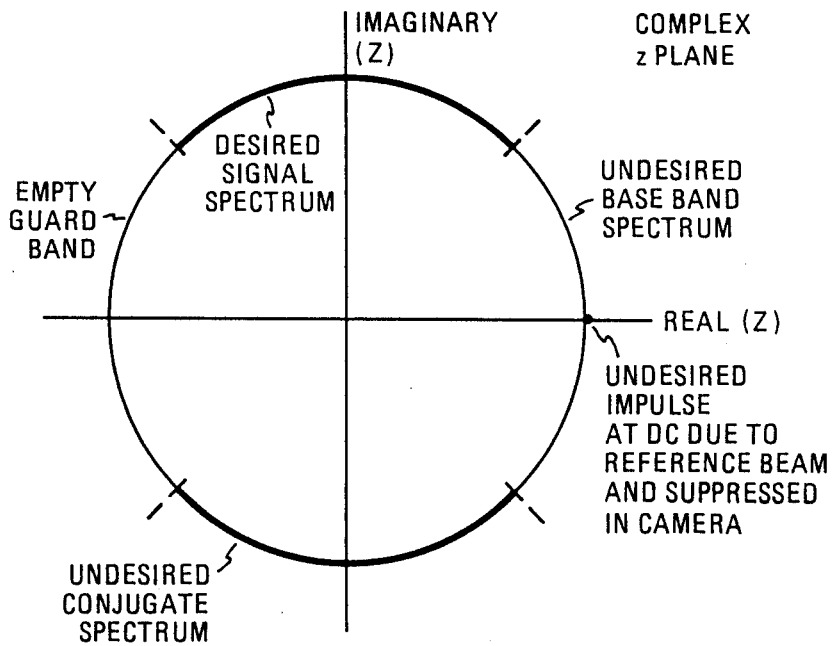
FIG. 5 COMPLEX z PLANE REPRESENTATION OF SAMPLED DATA SPATIAL FREQUENCY SPECTRUM IN x DIRECTION

FIG. 8B DETAIL A
VERTICAL SELECT SCANNER.
VERTICAL CLAMP SCANNER (TRANSPOSED).

DETAIL B
HORIZONTAL SCANNER

FIG. 10A z PLANE ZERO LOCATIONS
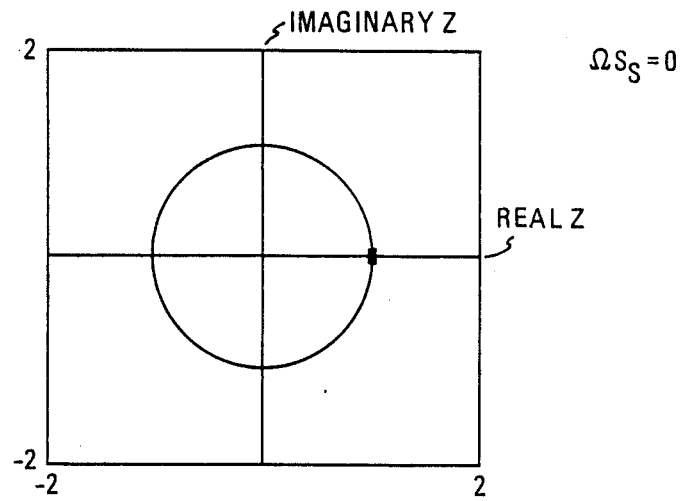
FIG. 10B CAMERA FREQUENCY RESPONSE
(INCLUDING DIFFERENCING AND FINITE AREA)
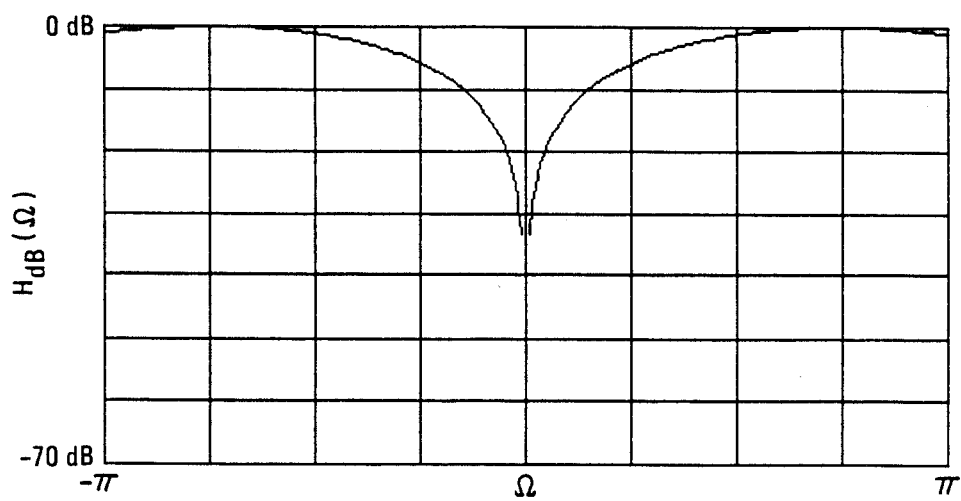

FIG. 11 z PLANE ZERO LOCATIONS
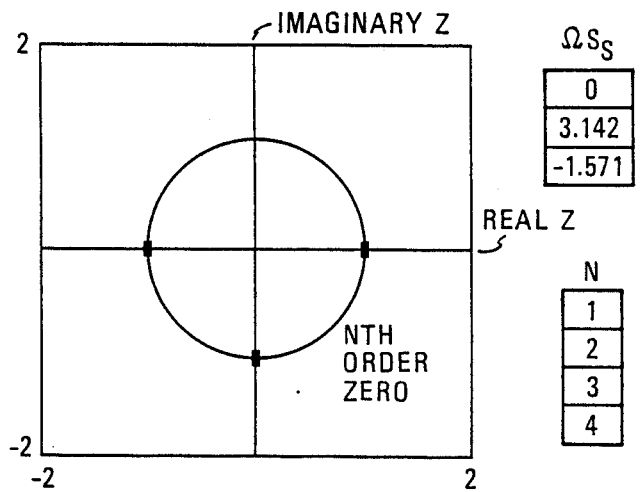
FIG. 12 NET FREQUENCY RESPONSE OF TOTAL SYSTEM AFTER DECIMATION BY 2
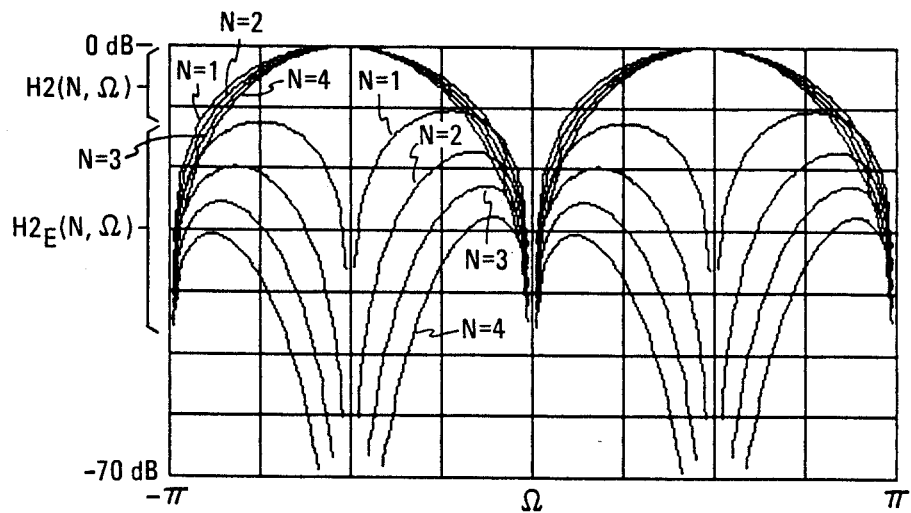

NET FREQUENCY RESPONSE OF TOTAL SYSTEM AFTER DECIMATION BY 2

NET FREQUENCY RESPONSE OF TOTAL SYSTEM AFTER DECIMATION BY 4

MAXIMUM PHASE ERROR OF NET SYSTEM

ELECTRONIC HOLOGRAPHIC APPARATUS

BACKGROUND OF THE INVENTION

1. Field of the Invention

The invention relates to holography and more particularly to an electronic holographic apparatus whose electrical output represents the magnitude and phase of coherent light reflected from a three-dimensional object and distributed over the aperture of the apparatus. Such information once sensed and suitably processed, permits recreation of the optical wavefront and hence reconstruction of the object field which generated that wavefront for such purposes as imaging, interferometry, matched filtering or correlation.

2. Prior Art

Holography is a well established technology finding application in several fields. A hologram is essentially a recording containing the magnitude and phase of light of a single wavelength as a function of position in some receive aperture. To the observer, a hologram of a three-dimensional object, when appropriately displayed, gives a sense of depth characteristic of the object. This is in contrast to the flat two-dimensional, reconstruction of a three-dimensional object obtained by traditional photography.

The search for a three-dimensional reconstruction led to the stereopticon slides of the early 20th Century, where two pictures were obtained by two cameras placed side by side (or by a single camera with two lenses and two separated films) which were simultaneously exposed. The exposed films were processed to obtain a pair of prints, which were set up for viewing in a hand-held viewer which allowed one eye to view one picture and the other its companion, and the viewer received a 3-D impression. In the stereoptican slides it was clear that slightly different images were being supplied to the eyes corresponding to two separate view points.

The illumination for the early stereopticon was broad band white light but the process continued to be practical when color film was introduced and two full color images were used for creating a 3-D impression.

The 3-D perception was next induced without developing two full color images, but rather developing a red emphasizing image and a blue-green emphasizing image for the separate eyes. This process was used in movies, where the viewers were handed a pair of glasses, each pair having one lens passing the red emphasizing image and the other lens the blue-green image. This allowed the viewer to view two images superimposed upon a single screen. It was evident that the eyes could be tricked into perceiving depth by several strategies.

The scientist, however, recognizing the wave nature of light, wanted always to capture the magnitude and phase of light of a single wavelength from a 3-D object reaching an aperture, and using that magnitude and phase information of that light to reconstruct the original wavefronts in a way that would approach identity with the original 3-D object. If this were possible, then the viewer with both eyes open, without filters or other attachments, could view the reconstruction, while moving his head slightly from side to side, and would see a slightly different image as he moved, and be tricked into thinking a 3-D object was in front of him. In practice, this meant that a holographic image using light of a single wavelength could be projected into the space in front of the viewer from a flat wavefront recording, to reconstruct a 3-D object and the viewer would think the flat sheet from which light was transmitted or reflected into his eyes was a window which contained the 3-D object. The two eye, 3-D perception test of a hologram is an approximate measure of the proper construction of a hologram.

However, it is clear by the use of the information for interferometric and other purposes, that recovery of the original wavefronts by recovering the magnitude and phase over an aperture is in fact, achievable, and may be done with extreme fractional optical wave length accuracy. In principle, a hologram may be obtained by illuminating the desired scene with light of a single wavelength i.e., coherent light. The light scattered from an object field has a particular magnitude and phase distribution (over a receive aperture). This distribution is uniquely related to the optical details of the object field. The hologram is a suitably encoded recording of this magnitude and phase information as a function of position in the receive aperture. The hologram permits reconstruction of the optical wavefront scattered from the object field as viewed within the receive aperture. Properly reconstructed wavefronts will then approach congruence with the original coherent light scattered from the object field.

With present technology, holograms are typically recorded on photographic film or equivalent storage media. Subsequent processing for reconstruction of the image must then be done optically with laser illumination, expensive diffraction limited lenses, etc. in a second, separate step. Practice of the two-step process as early as 1950 is attributed to Professor Dennis Gabor of England (Van Nostrand's Scientific Encyclopedia 1968, D. Van Nostrand Company, Inc.)

The process as customarily practiced requires that film be exposed, developed, and then set up in an optical reconstruction apparatus. Other holographic arrangements have been proposed, as for instance those for interferometric motion studies, in which a vibrating member is viewed in an active television camera system, and the fringe patterns studied in a continuous process to determine small displacements.

At present, a general purpose apparatus for forming an electrical holographic image of an object field, which may be directly displayed or processed, is not currently available. Preferably, the electrical output of such an apparatus would provide an electrical representation of the hologram, the electrical representation then being capable of being recorded, filtered, displayed, and/or updated at a rate suitable for sensing static or dynamic object fields in a continuous process.

An expected advantage of such an electronic apparatus in sensing an object field in real time would be in providing an interface between a coherent optical wavefront and a digital data processing system. In such an apparatus, software processing could be used to perform such functions as imaging, interferometry, matched filtering, correlation, etc. Thus, expensive diffraction limited optical hardware would be largely unnecessary, and replaced by software. In addition, the process could be direct and continuous.

SUMMARY OF THE INVENTION

Accordingly it is an object of the invention to provide a novel, general purpose electronic apparatus for sensing holographic data.

It is another object of the invention to provide a general purpose electronic holographic apparatus for sensing holographic data for use in imaging, interferometry, matched filtering or correlation.

It is still another object of the invention to provide a novel holographic apparatus which senses holographic data, descriptive of a detailed 3-D object illuminated with coherent light, and converts the optical signal to an electrical signal representing the complex magnitude and phase information of the holographic data, suitable for imaging.

It is a further object of the invention to provide a novel electronic holographic apparatus for sensing static or dynamic object fields.

It is yet another object of the invention to provide a novel electronic holographic apparatus for obtaining holographic data in an electrical form permitting the data to be processed in a direct and continuous fashion.

These and other objects of the invention are achieved in a novel electronic holographic apparatus comprising means for producing mutually coherent optical illuminating and reference beams and a camera.

The illuminating beam illuminates the object field to cause the light reflected from the object field to enter the camera aperture and form a pattern of speckles, which are intrinsic features of light scattered from diffuse objects under coherent illumination. Thus "speckles" are the resolvable features of a coherent wavefront. The reference beam illuminates the aperture from a virtual position displaced to one side of the object field, so that a linear superposition of sinuosoidal fringes is created upon the speckle pattern. The arrangement creates fringes that are substantially parallel and of independent phase and amplitude. In addition, the reference source position and the center of the object field are set to have an angular separation, measured at the camera aperture, creating on the average at least one dark region and one light region per speckle, an essential to determining the phase and magnitude of the speckle.

The aperture of the camera is made sufficiently wide to permit resolution of separate elements of the object field, and an array of optical detectors are provided arranged in rows and columns, the rows being perpendicular to the fringes and the columns being parallel to the fringes. The outputs of the detectors are periodically sampled, responding as square law devices to the incident light to produce cross product terms when impinged on by the two sources.

The speckles are imaged with sufficient magnification such that on the average, a full wave (a dark and a light region) of a speckle impinges on an adequate number of detectors in a row to determine unambiguously the magnitude and the spatial phase of the fringe. Typically this requires four detectors.

Thus an electrical signal is obtained in the sampled outputs of the detectors representing the spatial phase and amplitude of each speckle on the average. When this electrical signal is processed to eliminate extraneous terms, the original wavefronts, i.e., the hologram may be recovered, and the scene reconstructed in a manner approximating the Fresnel/Fourier transformation operation provided by a lens, but not requiring a lens, if the proper wavefront processing is provided.

In this process, the illuminated object field and the reference produce a spatial spectrum over the camera aperture giving rise to four spatially superimposed terms which appear in the sampled detector outputs.

These terms include a spectral term of uniform value due to illumination by the reference beam, a spectral term representing the speckle pattern due to the illuminated object field, an unwanted negative spatial frequency spectral term corresponding to the conjugate term of the cross product due to light from the illuminated object field and the reference, and a desired positive spatial frequency spectral term corresponding to the direct cross product term due to light from the illuminated object field and the reference.

In accordance with the invention, the position of the virtual reference point is displaced from the center of the object field at an angle measured at the camera, greater than the angle subtended by the object field. This physical disposition causes the four terms, although spatially superimposed over the aperture, to be distributed in the spatial frequency spectral domain in mutually separated positions. In short, they are in a condition by which they may be separated by an appropriate Finite Impulse Response (FIR) filter capable of separating the terms by their spatial frequencies.

In accordance with a further aspect of the invention the reference is a virtual point source, the center of the object field and the virtual reference point being disposed at substantially the same distance from the sensor plane to cause the fringes in all speckles to be of substantially equal spatial frequencies, and the detectors are spaced at equal intervals along said rows for efficient phase and amplitude measurement.

In accordance with a further aspect of the invention, the sampled outputs of n successive detectors in each row are subtractively combined to obtain an (n−1) fold set of output differences. The effect of differencing is to eliminate the spectral term of uniform value and a substantial portion of the spectral term of the speckle pattern per se from the camera output. The spectral term of the speckle pattern is further reduced by setting the intensity of the reference beam high in relation to the intensity of the illumination reflected from the object field to the bounded planar region.

The two foregoing measures may be regarded as a part of the FIR filter in their function of isolating the desired cross product term containing the holographic information, or as means to simplify the final task of a final FIR filter, whose remaining task is to separate the two cross product terms to isolate the desired cross product term.

Finally, a conventional finite input response (FIR) filter, to which the sequence of output differences in sampled detector outputs is coupled, is provided for removing the undesired negative frequency cross-product spectral term, deriving the desired positive frequency cross product spectral term.

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings, in which:

FIG. 1B illustrates an artist's rendering of the grated speckle pattern which is formed when light from the coherently illuminated object field and light from a second location from the same coherent source illuminate the sensor plane of the CTD and interfere; and FIG. 1C illustrates the pattern of sensors making up the sensor plane upon which the grated speckle pattern forms;

FIG. 2 deals with the intensity distribution across the aperture of the sensor plane and for purposes of analysis illustrates an elemental arrangement in which a single point from the object field and a single point reference source illuminate an observation point in the sensor plane;

FIG. 3 deals with the spatial spectrum of the intensity distribution in the sensor plane due to all points in the object field under the conditions of illumination illustrated in FIG. 1A, illustrating in particular the spatial frequency spectra in the X direction of that distribution;

FIG. 4 is an illustration of the angular antenna weighting pattern imposed on the X and Y distributions of the spatial frequency spectra along both the X and Y axes due to the finite area of the sensors;

FIG. 5 is a complex "Z plane" representation of the sampled data spatial frequency spectrum in the X direction useful in explaining of the filter requirement for selecting the desired complex spectrum of the sensor field and for rejecting undesired spectra;

FIGS. 10A and 10B illustrate the filtering effect of differencing; FIG. 10A illustrating the Z plane zero location on the unit circle and on the positive real axis differencing produces, and FIG. 10B illustrating the notch differencing produces in the camera frequency response at dc and low spatial frequencies combined with the filtering effect of finite area sensors, FIG. 11 illustrates the Z plane zero locations for an added external FIR filter in accordance with an exemplary embodiment, in which from one to four successive zeros are added on the unit circle at the negative imaginary axis, along with a single zero on the unit circle at the negative real axis;

FIG. 12 illustrates the net frequency response upon the desired and undesired signal spectra of the total system including an added external FIR filter having the Z plane zero locations of FIG. 11 and providing decimation by two;

DESCRIPTION OF THE PREFERRED EMBODIMENT

Figure 1A:
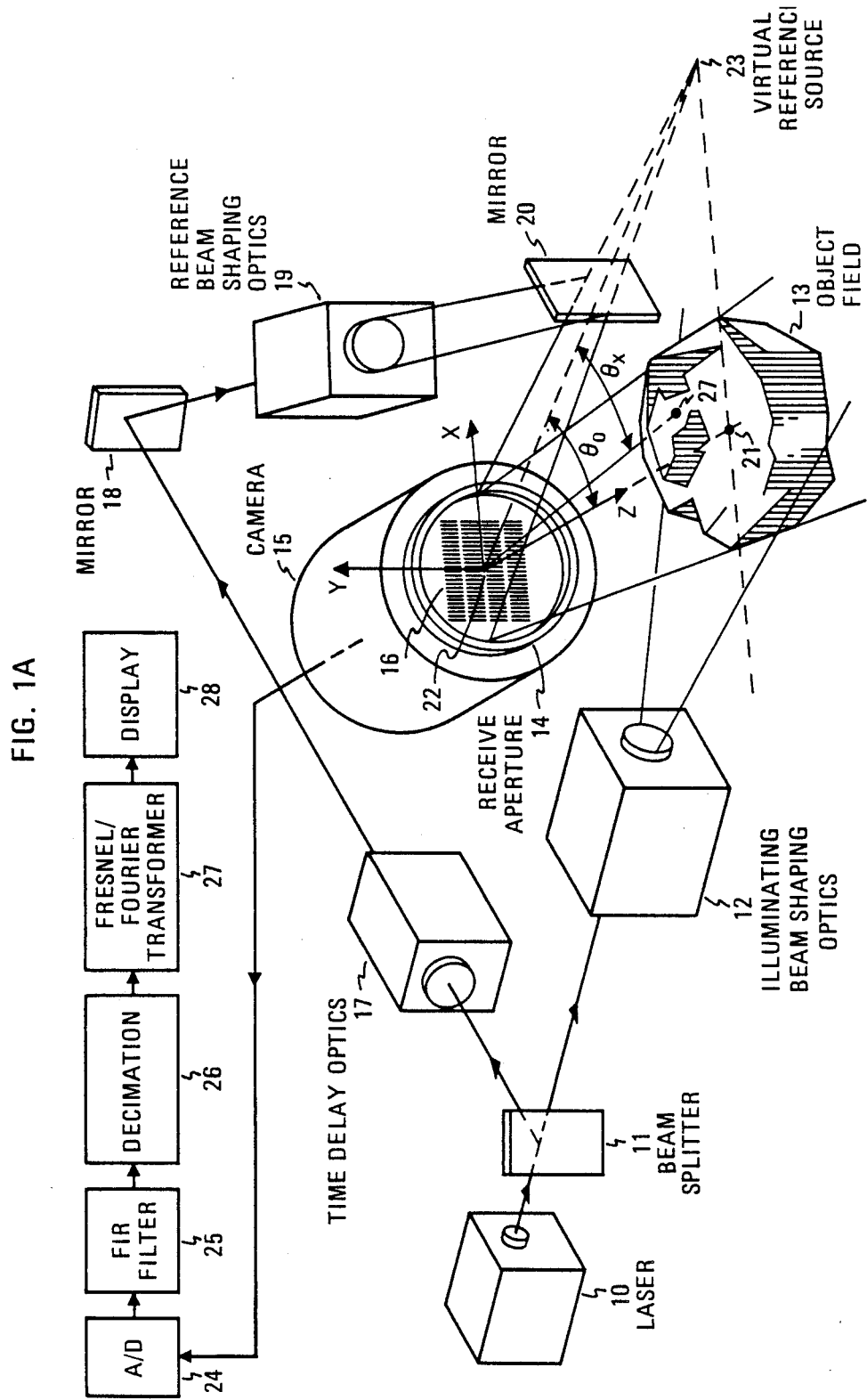
FIG. 1A is a perspective view of apparatus for recording the hologram of an object field utilizing a Charge Transfer Device (CTD)

Referring now to FIG. 1A, a perspective view of an apparatus for recording the hologram of an object field is illustrated. The apparatus records holographic information of the object field through an aperture of sufficient size to resolve individual elements of the object field. The holographic record may be used for several purposes including sensing displacements or reconstruction of the object field, as illustrated.

The apparatus comprises means for producing mutually coherent optical illuminating and reference beams, and a Charge Transfer Device (CTD) camera having an aperture directed toward the object field, receptive of the reference beam, and suitably aligned with respect to the beams and object field to record holographic data. The camera, which operates without a conventional focusing lens, samples the illumination impinging on photo-detectors disposed on the sensor plane. The illumination impinging on the sensor plane may be characterized as a Fresnel/Fourier transform of the light reflected from the illuminated object.

The electrical signals derived from the photodetectors are converted to a digital format in the A/D converter 24, and are then subjected to a finite impulse response (FIR) filter 25 to remove undesired illumination terms and to separate out the desired phase and amplitude information required to characterize the hologram. An important feature of the apparatus is the taking of differences between the outputs of adjacent photodetectors. While physically this may be a part of the circuitry on the sensor plane, mathematically it may be regarded as a part of the FIR filter. Decimation of the data by 2 or 4 (i.e. taking every second or fourth sample of the filtered data) normally simplifies the eventual data processing and is indicated by the block 26. Additional matrix processing of the filtered data may be provided by a Fresnel/Fourier transformer 27 to reconstruct the object field for a display 28.

As seen in FIG. 1A, the illuminating and reference beams originate from a single laser 10, the beam from the laser impinging on a beam splitter 11 which diverts a portion of the laser energy into a separate path for the reference beam. The portion of the laser beam which is not diverted is supplied to the illuminating beam optics 12 where the laser beam is expanded to illuminate the object field 13. Thus, coherent light reflected from the object field enters the aperture 14 of the CTD camera 15, and creates a speckle pattern over the sensor plane 16 of the camera. The portion of the laser energy which is diverted at the beam splitter 11, transverses the time delay optics 17, a mirror 18, reference beam shaping optics 19 and a mirror 20. The mirror 20 projects the reference beam back via the aperture 14 to the sensor plane 16 of the camera. The function of the illuminating beam shaping optics is to illuminate that portion of the object field viewed by the camera. The function of the reference beam shaping optics 19 is to illuminate the sensor plane which provides a means for obtaining the phase information for the hologram. As will be explained, the optics 19 is designed to place the virtual source of the reference beam at the same distance (Z coordinate) from the sensor plane as the center of the object field.

In the FIG. 1A illustration, the optical paths of both illuminating and reference beams originate at the laser 10 and both terminate on the sensor plane of the camera. If the path lengths of the two beams are sufficiently equalized, both beams will reach the sensor plane at the same time on the average and any laser instability will be minimized thus preserving fractional optical wavelength accuracy in the holographic information read out at the sensor plane. The time delay optics 17 provides the means to equalize the path lengths of the two beams. Differences in the path lengths of the two beams from the laser 10 to the sensor plane 16 will always exist if the object field is of extended depth (in the Z axis direction). Greater differences between the two path lengths may be tolerated, however, as the coherence length of the laser is increased. Therefore, the more stable the laser, the greater the tolerable differences in path lengths, and the greater the depth of field, before instability in the measurements becomes significant.

The reference beam provides the means for obtaining the phase information for the hologram. As the reference beam impinges on the speckle pattern already present on the sensor plane of the camera, due to the illuminating beam, a spatially periodic interference pattern, which may be termed a "grated speckle pattern" is created. The interference pattern with its successive light and dark regions allows appropriately placed sensors which sense only the intensity of the light to determine both its amplitude and its phase. The phase is, of course, measured with respect to the phase of the reference beam. Analysis shows that if adequate spatial sampling of each speckle is obtained on the average, one may obtain the amplitude and phase information of each speckle (on the average) and in general obtain an adequate amount of information of the complex wave front at the sensor to record the hologram for later reconstruction of the object field.

The CTD camera may take several forms, it being essential to both efficient signal preamplification and to FIR filtering of the photo-detector output that the camera provide means for obtaining signal differences between successive photo-detectors along common rows.

Figure 8A:
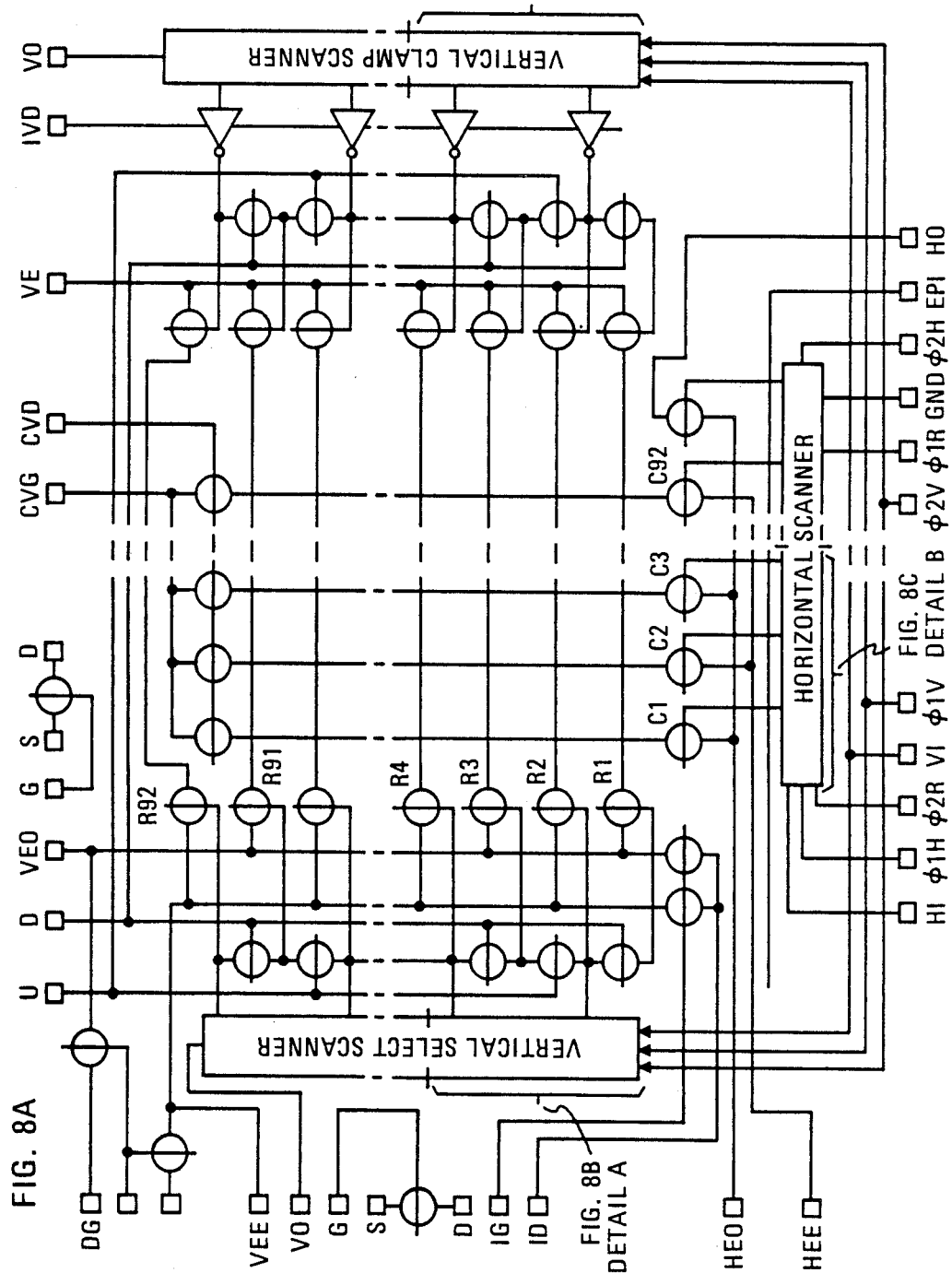
FIG. 8A is a schematic diagram of a CID sensor suitable for use as the CTD in the camera and in particular designed to take differences between successive sensors in the X dimension.
Figure 8C:
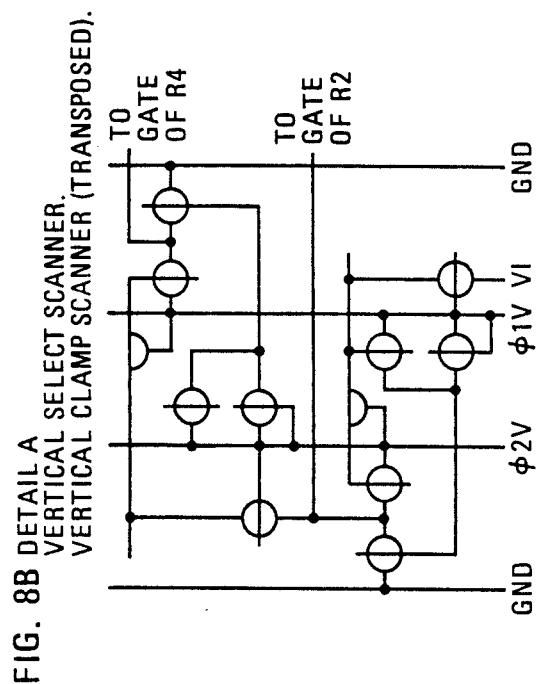
FIG. 8B and its transposition illustrating respectively the circuit particulars of the vertical select scanner and the vertical clamp scanner, and FIG. 8C illustrating the circuit particulars of the horizontal scanner.

A suitable camera for this application is a Charge Injection Device (CID) having an array of typically 256×256 photo-detector sites subject to row read out as illustrated in FIGS. 8A, 8B and 8C. The details of the camera and the means by which differences are taken will be discussed subsequently.

The recording of holographic information gains greatly in accuracy of amplitude and phase measurement and in overall sensitivity if the spatial relationships illustrated in FIG. 1A are maintained. The illumination, the source of the reference beam, and the location of the object field establish a three coordinate system, with which the angular aperture and sensor plane of the camera must be brought into alignment for optimum phase and amplitude fidelity and for maximum sensitivity. Proper positioning of the reference source, object field and camera establishes the position, orientation and spatial frequency of the fringes, and in the preferred disposition, makes the spatial frequency of the fringes substantially constant over the camera aperture. Proper orientation of the sensor plane of the camera in relation to the fringes, and proper magnification of fringes in relation to the interval between sensors on the sensor plane further facilitates accuracy in recording the holographic information. These matters will now be discussed in detail.

Referring again to FIG. 1A, the camera is ideally positioned to place the center 21 of the object in a line perpendicular to the sensor plane erected from the center 22 of its aperture. Thus the origin of a three axis coordinate system is the center of the sensor plane, the Z axis being the line perpendicular to the sensor plane passing through the center 21 of the object. The X and Y axes lie in the sensor plane, but their orientation remains undetermined until the position of the reference beam is fixed.

The reference beam shaping optics 19 are adjusted to place the position of the virtual source of the reference beam at the point 23. The virtual source 23 of the reference beam is small in relation to the object field, and may be treated as a point source. The interference fringes produced by the reference illumination and the illuminated object field are perpendicular on the average to the plane defined by the points 21, 22 and 23. On the other hand only light originating along the line of intersection of the plane 21, 22, 23 with the object field will produce fringes exactly perpendicular to that plane. Exactness is not required to achieve accurate results over a reasonable field of view. Thus, to sample the spatial frequency of the fringes generated from all points of the object field, the photo-detectors should be arranged in rows parallel to the plane (21, 22, 23). The intersection of this plane (21, 22, 23) with the sensor plane thus defines the X axis, and by inference the position of the Y axis, which is defined to be perpendicular to the X axis. The columns of sensors are parallel to the Y axis. The rows of sensors, which are used for determining the spatial phase of the fringes are thus parallel to the X axis.

Further in accordance with the invention, the virtual reference source is disposed at the same Z coordinate distance from the origin as the center of the object field. This has the advantage of reducing parallax from different view points within the receive aperture as to the same object point and tends to make the fringe spacing more uniform. With uniformity in the fringe spacing, constancy of the spatial sampling rate becomes more efficient.

Continuing, the spatial angular spectrum depends upon the angle ($\Theta$) between the point of origin (23) of the reference beam and the resolution points in the object field. When the object field is in the far field of the receive aperture, the angle between a given point in the object field and the normal to the plane of the receive aperture (i.e. the Z axis) is the same for all viewpoints within the receive aperture. Under these conditions, a collimated reference beam appearing to come from the far field is desirable. However, when the object field is in the near field of the receive aperture, which is the usual case, a fixed point in the object field appears at different angles as seen from different points within the aperture. Under these conditions, the superposition of a collimated reference beam at a fixed angle results in an interference pattern whose fringe spacing varies considerably with position in the aperture. A large variation in the fringe spacing results in inefficient sampling of the pattern. The condition can be mitigated by placing the point 23 of the reference beam at nominally the same Z coordinate distance as the center of the object field. Under these conditions there is no parallax between points in the object field and the reference point. This results in the angle between the reference point and any fixed point in the object field being nominally the same for all viewpoints within the receive aperture and leads to uniformity in the fringe spacing and efficiency in sampling those fringes at a constant spatial sampling rate.

FIG. 1B is an artist's depiction of a portion of the speckle pattern appearing upon the sensor plane of the camera 15. The speckle pattern is shown to the same scale and orientation as the sensor pattern shown in FIG. 1C.

In the FIG. 1B illustration, a small portion of the total grated speckle pattern is shown and the rendering in black and white is a rough approximation to the more gradual gradations in light and dark which actually occur. Assuming a conventional camera application, the illustration shows only about 0.2% percent of the useful speckle pattern and of the sensor plane. The fringing or grating of the speckles is attributable to the interference between monochromatic light from the object field with monochromatic light from the reference source. The two sources, as already described, are mutually coherent, and so long as the elements in the object field are stationary, the pattern also remains substantially stationary, some disturbance being caused by the passage of the beams through air in motion, or by small vibrations of the elements of the optical system.

The orientation and spacing of the fringes are established by the positioning of the points 21, 22 and 23. Thus each fringe is parallel to the Y axis, and successive fringes of the sample speckle are spaced along the X axis. A dark region and a light region is a full wave ($2\pi$ radians) of the spatial frequency of the speckle, and a speckle of average size is selected to have at least a full wave of fringes so as to permit detection of the spatial phase of the speckle. The number of fringes per speckle is controlled by the angular displacement ($\Theta_0$) of the virtual reference source from the Z axis.

The holographic information from a speckle is captured in its brightness and its instantaneous spatial phase. As illustrated in FIG. 1B, the spatial phase of each speckle differs from that of its neighbors in what appears to be a quite random manner.

The sensor pattern, which in a typical case, is four times as fine as the fringe pattern, provides the means for sampling the grated speckle in such a way as to recover both the phase and amplitude of each speckle (on the average) and thus capture the information necessary to construct a hologram.

The illumination creates both desired and undesired terms to which the sensors respond while the sampling process creates artifacts of its own. The desired and undesired terms, and a portion of the artifacts introduced by the sampling process are treated in FIGS. 3, 4 and 6.

FIG. 5 is a complex Z plane representation of the filter performance required to select the desired spectral term and reject the undesired spectral terms. The selection of the useful terms is achieved by differencing taking place in the photo-detector outputs, by adjustment of the reference beam intensity in relation to object field intensity and by FIR filtering, as will be further explained hereinafter.

Returning to FIG. 3, the spatial frequency spectrum measured in the X direction of the intensity distribution (squared magnitude of the light amplitude) in the receive aperture is shown. The units measured along the horizontal axis are radians per unit length. The parameter k is equal to $2\pi$ divided by the optical wavelength. The angle $\Theta_X$ is the central angle measured at the origin 22 (in FIG. 1A) between a selected single point 27 in the object field and the beam reference point 23. (Thus, the angular position of a single point in the object field is seen to be directly mapped into a corresponding single spatial frequency component.)

The spatial frequency spectrum in the x direction of the intensity distribution in the receive aperture of FIG. 1A is illustrated in FIG. 3. The spatial frequency spectrum represents a spatial Fourier/Fresnel integration of the optical power distribution impinging on the elemental sensor areas over the aperture.

As a first step to analyzing that spectrum, the optical power per unit area at the position p in the plane of the receive aperture I(p), may be considered. It may be expressed as follows:

$$I(p) = I_R + (|S(p)|)^2 + I_n(p) + I_p(p) \qquad (1)$$

where $I_R$ is the substantially constant intensity over the aperture plane due to the reference beam;

$(|S(p)|)$ is the magnitude of net optical object light at point p in the receive aperture due to the total illuminated object field;

$I_n(p)$ = unwanted (negative frequency) component of net intensity distribution corresponding to the conjugate of the light from the object field, i.e. the product of the conjugate of the complex amplitude of the light from the illuminated object field and the complex amplitude of light from the reference source; and $I_p(p)$ = desired (positive frequency) component of net intensity distribution corresponding to the light from the object field, i.e. the product of the complex amplitude of light from the illuminated object field and the conjugate of the complex amplitude of the light from the reference source.

The four terms of expression (1) when integrated by a spatial Fourier/Fresnel transformer over the aperture, form four corresponding spatial spectral terms. When the camera, illumination geometry, and object field are suitably disposed, the resulting spectral terms are distributed in mutually separated positions over the spatial frequency spectrum illustrated in FIG. 3.

The mathematical basis for the terms of expression (1) may best be explained by resort to an analysis of the intensity distribution across the aperture of the sensor plane using the elemental example of two point sized light sources illustrated in FIG. 2. Here a reference beam is assumed to be present radiating light from an arbitrarily located reference point, and a nearby object field is present comprised of a single point radiating reflected light. A mathematical description of the resulting interference pattern over a distant sensor plane within the receive aperture of the camera is the object of the following discussion.

The two point source example of FIG. 2 is established on the cartesian coordinate system already described. The three points of interest are the locations of the point sources (designated as reference point source and an object field point source), and an observation point in the receive aperture. The vectors are defined interconnecting the points as shown in the figure. The following definitions apply.

$[X_R, Y_R, Z_R]$ are the coordinates of reference beam source point source $[X_S, Y_S, Z_S]$ are the coordinates of the object field point source $(x,y,0)$ are the coordinates of observation point in receive aperture $\overline{V}_R$ is the distance vector from reference point to the observation point $\overline{V}_S$ is the distance vector from the object field point to the observation point $V_R$, $V_S$, are the magnitudes of the respective distance vectors Consider spherical waves radiating from each point. These waves may be described as follows. The complex amplitude of a wave from reference point at range r from an observation point on the sensor is:

$$\frac{A_R e^{j\phi_R}(e^{-jkr})}{r}$$

where:

$A_R/r$ is the magnitude of the complex amplitude of a wave from the reference point at range r from an observation point on the sensor (the magnitude squared being equal to the optical power per unit area at the range r from the reference point). $\phi_R$ is the phase of the reference at the source point (i.e. at r=0). The complex amplitude of a wave from the object field point at range r from an observation point on the sensor is:

$$\frac{A_S e^{j\phi_S}(e^{-jkr})}{r}$$

where:

$A_S/r$ is the magnitude of the complex amplitude of a wave from an object field point at range r from an observation point on the sensor (the magnitude squared being equal to the optical power per unit area at the range r from the reference point). $\phi_S$ is the phase of the object point at its source (i.e. at r=0).

The net complex amplitude at a selected observation point is the superposition of these two components, with the appropriate values for the vector magnitudes used for r as required.

The intensity I for the two point source example varies with the position (x,y) of the observation point in the receive aperture. The expression for the intensity I, which may be derived using certain simplifying assumptions (e.g. that the distance between the two source points is small in relation to their distances to the observation point), may take the following form:

$$I(p) = I_R + I_S + 2 \cdot \sqrt{I_R} \cdot \sqrt{I_S} \cdot \quad (2a)$$

$$\cos[k_x \cdot x + k_y \cdot y + \phi_S - \phi_R + k \cdot [V_S - V_R]]$$

where:

$$I_R = \frac{A_R^2}{V_R^2} \text{ being the reference source intensity at } (x,y) \quad (2b)$$

$$I_S = \frac{A_S}{V_S^2} \text{ being the object source intensity at } (x,y) \quad (2c)$$

where:

$$k_x = k \cdot \left[ \frac{X_S}{V_S} - \frac{X_R}{V_R} \right]$$

$$k_x = k \cdot [\sin[\theta_{Sx}] - \sin[\theta_{Rx}]] \quad (2d)$$

$$k_y = k \cdot \left[ \frac{Y_S}{V_S} - \frac{Y_R}{V_R} \right]$$

$$k_y = k \cdot [\sin[\theta_{Sy}] - \sin[\theta_{Ry}]] \quad (2e)$$

Thus the intensity in the receive aperture is seen to vary sinusoidally with position about a bias value. The spatial frequencies in the x and y directions of this variation are seen to depend on the angle between the reference and object points, as seen from the observation point in the receive aperture. Placing the reference point at the same range as the object point eliminates parallax between these points, which results in this angle and corresponding spatial frequency being constant over the receive aperture.

The spatial phase of this sinusoidal variation is seen to depend on the phase difference between the object and reference points, as well as their positions. These are indicated by $\phi_S$, $\phi_R$ and $V_S$, $V_R$ respectively.

The bias term $(I_R+I_S)$ in equation 2a contains no useful information and should be eliminated by differencing in the camera as will be subsequently explained.

The position of the object point relative to the reference point can be uniquely determined from the spatial frequencies by using equations 2d through 2e.

The position of the sinusoidal pattern can be measured from the sensor data, and used to determine the phase of the object points in relation to the reference point. This corresponds to the quantity, given in equation (2a) as $\phi_S - \phi_R + k (V_S - V_R)$.

The amplitude $A_S$ of the object point can be determined from equation 2c by knowing the intensity $I_S$ and the range $V_S$. The range is known from the object reconstruction. The intensity is determined from the amplitude of the sinusoidal variation, as seen in equation 2a. It is assumed that the reference intensity $I_R$ is known.

Summarizing, knowing the position, amplitude, and phase of the reference beam point, and using the relationship of expression 2a through 2e, one may determine the unknown position, amplitude, and phase of a nearby object point from the details of the intensity pattern resulting from the superposition of light from the reference point and an unknown object point at a receive aperture. The foregoing analysis is premised on a two point example.

The object field, however, occupies an extended but finite volume in space rather than the single point just considered. The reference point is distinguished from points in the object field by being located outside the object field boundaries and for reasons, which will be developed, is made brighter than the object field. That is, the intensity at any point in the receive aperture due to the reference beam is greater than the intensity at that point due to the light from the total object field.

Equation 3 below gives the complex amplitude S(p) at a point p in the receive aperture due to the total extended object field. The net electric field vector at any point in this aperture is the superposition of the fields due to the set of sources in the object field, and its complex amplitude is given as follows.

$$S(p) = \int |A[p_S]| \cdot e^{j \cdot \phi[p_S]} \cdot \frac{e^{-[j \cdot k \cdot r_S[p,pS]]}}{r_S[p,pS]} dv \quad (3)$$

where:

p is a point in receive aperture $p_S$ is a point radiating light in the object field (which contains many such points)

S(p) is the complex (magnitude and phase) net amplitude of the E vector at point p in the receive aperture $|A(p_S)|$, $\phi(p_S)$ are the magnitude and phase respectively of the light source at the point $p_S$ in the object field $r_S(p, p_S)$ is the magnitude of the distance from point $p_S$ in the object field to point p in the receive aperture, and dV is an increment of volume containing source points of the object field.

In all cases of present interest, it is the complex distribution $\bar{S}(p)$ which is available for measurement at the receive aperture. The corresponding source distribution at the object, which is described by the magnitude $A(p_S)$ and the phase $\phi(p_S)$, is defined as the "equivalent object".

The actual object is typically comprised of physical reflecting facets illuminated by coherent laser radiation. These facets may be discrete scattering particles such as in a fog or aerosol, or they may be large objects with continuous reflecting surfaces.

The complex light distribution over the receive aperture must be suitably processed to reconstruct the perception of the equivalent object. Optically, this is typically done by a lens. In the present application, a beamforming technique is used for this purpose.

Taking the complex amplitude S(p) from equation 3; adding the reference beam light and multiplying the sum by the complex conjugate yields the following net intensity I(p).

$$I(p) = I_R + (|S(p)|)^2 + 2 \cdot \sqrt{I_R} \cdot |S(p)| \cdot \cos[\phi_{Sp}(p) - \phi_{Rp}(p)] \quad (4)$$

where:

I(p) is the total optical intensity at point p in the receive aperture $I_R$ is the intensity due to reference beam, which is uniform with position in the receive aperture $|S(p)|$ is the magnitude of net optical amplitude signal at point p in the receive aperture due to total object field.

$\phi_{Sp}(p)$ is the net phase of light at point p in the receive aperture due to total object field, (i.e. $\phi_{Sp}(p) = \phi_S - k \, r_S(p, p_S)$) and $\phi_{Rp}(p)$ is the phase of light at point p in the receive aperture due to the reference beam (i.e. $\phi_{Rp}(p) = \phi_R - k \, r_R(p, p_R)$ where $r_R(p, p_R)$ = magnitude of the distance from the reference point to point p in the viewer aperture.

The nature of the intensity pattern given by equation 4 can be appreciated by considering it in terms of the two point distribution given by equation 2a-e. In all cases, the net complex amplitude is the linear superposition of the complex amplitudes due to each point, including the reference point. When multiplying by the complex conjugate to obtain intensity, all possible combinations of point pairs occur. Each point pair can be described according to equation 2a-e. The sum of the effect of all possible point pair combinations is the net result and is given by equation 4.

The point pair combinations can be considered to be one of three types, corresponding to the three terms of equation 4. These types are:

reference point and reference point object point and object point reference point and object point The reference point times its complex conjugate yields the term $I_R$, which is the large uniform bias term present in both equations 2a and 4.

An object point times the conjugate of any other object point (including itself) contributes to the squared magnitude of S(p), which is the second term of equation 4. The form of each such pair combination is similar to that described by equation 2a-e, except that the subscripts R and S used to designate the reference point and the object point respectively in equation 2a-e are replaced by m and n to designate points m and n in the object field.

The highest spatial frequencies $k_x$ and $k_y$ that can exist for terms of this type are seen to be limited by the maximum angular extent of the scene in the x and y directions respectively (i.e. see equations 2d and 2e).

This maximum frequency in turn dictates a minimum spatial size of a feature that can exist in the receive aperture due to this second term. This is in essence the minimum speckle size that can exist. This speckle distribution is given by the squared magnitude of S(p). This is the intensity distribution that would exist in the receive aperture if no reference beam were present. Since no phase information is present in this term, it is not of interest and is suppressed in the camera as will subsequently be described.

The final two terms, which include the one of interest, results from the product of light from the object field with the conjugate of the light from the reference point, plus the conjugate of this product. The sum of these is described directly by the cosine term in equation 2a. The sum of all such cosine terms for each of the points in the object field results in the cosine term of equation 4.

The reference point is intended to have the same y coordinate as the center of the object field, with the x coordinate displaced from the center of the object field by a sufficient amount to be outside of the boundaries of the object field.

Under these conditions the spatial frequency spectrum in the y direction is the same for the cosine term in equation 4 as it was for the speckle pattern given by the squared magnitude of S(p).

However, in the x direction the center frequency of the spectrum is dictated by the angle between the reference point and the center of the object field, (strictly the difference between the sines of reference and object angles according to equations 2d and 2e). This spectrum is spread over a bandwidth dictated by the angular size of the object field in the x direction, which is the same bandwidth as that of the speckle spectrum in the x direction.

The net intensity pattern given by equation 4 is a real function. Thus its spatial frequency spectrum has positive and negative frequency components which are complex conjugates of each other.

FIG. 3 schematically illustrates such a spatial frequency spectrum in the x direction. The component that is shown crosshatched in the figure is the component of interest. The other components shown are the result of the non linear squaring operation performed to convert amplitude into intensity.

The desired component of equation 4 is obtained by expressing the cosine function as the sum of two complex exponentials, and taking just the positive exponential.

$$I_p(p) = \sqrt{I_R} \cdot |S(p)| \cdot e^{j \cdot \phi S_p(p)} \cdot e^{-j \cdot \phi R_p(p)} \qquad (5)$$

where:

$I_p(p)$ is the desired (positive frequency) component of net intensity corresponding to the object field $$I_n(p) = \sqrt{I_R} \cdot |S(p)| \cdot e^{-j \cdot \phi S_p(p)} \cdot e^{j \cdot \phi R_p(p)} \qquad (6)$$

where:

$I_n(p)$ is the undesired (negative frequency) component of net intensity corresponding to conjugate of the object field.

Combining the definitions of equations 5 and 6 with equation 4 yields the net intensity distribution provided in expression 1.

It is now apparent that these four terms represent additive contributions to the intensity function which describes the optical intensity incident on the camera aperture. These four contributions are spatially superimposed on each other, each of them covering the entire camera aperture. These terms can be separated by spatial filtering, which is equivalent to being operated on by a Fourier/Fresnel spatial transform.

The Fourier operation is linear, so that the Fourier transform of the total function may be performed term-by-term resulting in four Fourier transformed terms, with a one-to-one correspondence to the original four terms. After transforming, these terms are no longer superimposed, and are found at different positions in the object or spatial spectral domain, as shown in FIG. 3.

Thus the term of interest may be Fourier/Fresnel transformed to produce a mathematical description of the "equivalent object" (cross-hatched region in FIG. 3). The mathematical algorithm by which this is accomplished is stated in the following formulae:

$$A_S[p_S] \approx \frac{1}{j \cdot \lambda \cdot <V_S>} \cdot \int\int S(x,y) \cdot e^{j \cdot k \cdot rS[x,y,pS]} dx dy \qquad (7)$$

where
$r_S$ = magnitude of the points distance between p and ps
$<V_S>$ = average value of $V_S$
Using equation (5) in substitution:

$$A_S[p_S] \approx \frac{e^{j \cdot \phi R}}{j \cdot \lambda \cdot <V_S>} \cdot \int\int \frac{I_p(x,y)}{\sqrt{I_R}} \cdot e^{j \cdot k \cdot [rS[x,y,pS] - rR(x,y)]} dx dy \qquad (8)$$

This is in essence a mathematical description of the algorithm by which the object is reconstructed from the camera data. This assumes that the coherent description of the optical wavefront from the object has been accurately recovered by isolating (by spatial filtering) the appropriate one ($I_p$) of the four intensity terms which are directly sensed by the camera according to the previous discussion, and then removing from this wavefront profile the known geometry of the reference beam. This results in the wavefront function which describes the light from the object in the camera plane. The equivalent object can be recovered from this in any plane in the locality of the object by the appropriate Fresnel transform.

It is a thrust of this teaching that the highly optimized FIR filtering provides the most efficient wa of isolating the desired term, and simultaneously achieving high phase accuracy. These designs allow the use of data which represents adjacent differences which are performed on the camera array, which eliminates the optical bias, and allows good sensing even when the reference beam is very much more intense than the light from the object. In addition, this results in more efficient data transmission from the camera, in that I and Q samples which only represent the desired term can be passed through the FIR filter from the camera, thus reducing the required data rate for a given frame time.

In the case of a single object point, this point can be localized by simple formulae, instead of the necessity of dealing with the complexity of a complete Fresnel transform. The optical phase, in the case of the single point object, associated with the desired term $I_p$, can be expressed:

$$\phi = k[V_S - V_R] + \phi_S - \phi_R \qquad (9)$$

where $V_S$, $V_R$ = slant distance to object and virtual reference points, respectively from the observation point:

$$p = x, y$$

and $\phi_S$, $\phi_R$ = optical reflection phase of the object and reference points, respectively.

In many applications, $\phi$ is modulated in time (e.g. sinusoidally by a vibrating target) either by a modulation of the optical index in the intervening medium, or by a motion of the target point.

By appropriate differentiation with respect to x and y of the above formula, the following relations between the geometry of the object-reference configuration and the successive derivatives can be shown:

$$V_S(x) = \frac{1 - \left[\frac{1}{k} \cdot \frac{d\phi}{dx} + \frac{x - X_R}{V_R}\right]^2}{\frac{1}{k} \cdot \frac{d^2 \phi}{dx^2} + \frac{1}{V_R} \cdot \left[1 - \left[\frac{x - X_R}{V_R}\right]^2\right]} \qquad (10)$$

$$X_S = x - \frac{V_S}{k} \cdot \frac{d\phi}{dx} - \frac{V_S}{V_R} \cdot [x - X_R] \qquad (11)$$

$$Y_S = y - \frac{V_S}{k} \cdot \frac{d\phi}{dy} - \frac{V_S}{V_R} \cdot [y - Y_R] \qquad (12)$$

The derivatives $d\phi/dx$, $d^2\phi/dx^2$, and the corresponding derivatives with respect to y, can be found from the phase data which is reported from the FIR filter. Such derivatives would be calculated using a global interpolation algorithm which uses most or all of the data across the camera aperture, which thus provides a high amount of spatial integration gain to improve the S/N ratio. Thus all of the elements in the right hand side of equation 10 are known, and $V_S$ can be calculated. Having this, all the elements in the right hand sides of equation 11 and 12 are known, and $X_S$, $Y_S$ can be calculated, resulting in complete localization of the object point.

It can be noted from the relations 10-12 that the angular position (in the x and y directions) of the object, from the observation point in the camera aperture, is proportional to the first derivative of phase, which is the spatial frequency in x or y. The slant distance $V_S$ is approximately proportional to the reciprocal of the second derivative of phase.

Returning to equation 5, the desired term $I_p(p)$ has an amplitude scale factor equal to the square root of the reference beam intensity. Raising the reference beam intensity accordingly raises the amplitude of the desired term above any electronic noise in the circuit.

In addition, equation 5 indicates the presence of an additional phase of $\phi_{RP}$ subtracted from the signal phase. This phase is due to the reference beam and is of the following form $$\phi_{Rp}(p) = \phi_R - k\, r_R(p, p_R) \tag{13}$$

where:

$r(p, p_R)$ is the radial distance from reference point to point p in the receive aperture (as previously defined)

$\phi_R$ is the reference beam phase at reference point (as previously defined).

The implication from equation 5 is that the desired signal must have its phase corrected by subtracting an additional phase shift of $k\, r_R(p, p_R)$ to obtain a result identical to that which would be present due to the object field alone without any holographic measurements. As will be explained below, correction of this phase may be achieved by subsequent software processing.

Equation 1 gives the optical power per unit area at position p in the plane of the receive aperture. This aperture contains discrete sensing areas as illustrated in FIG. 1C which integrate the total power over a given area to obtain a single real number which is the measured sample value for that position.

The following parameters, illustrated in FIG. 1C, are used to define the sensor geometry.

w is the width in x direction of each sensor area h is the height in y direction of each sensor area $d_X$ is the distance in x direction between sensor centers $d_Y$ is the distance in y direction between sensor centers m,n is the integer indices corresponding to sensor m in x direction and sensor n in y direction ($m\, d_X, n\, d_Y$) are the x,y coordinates respectively of center of sensor element m,n With these definitions, the total power sensed by element m,n of the camera is given by the following $$P(m,n) = \int_{[n \cdot d_Y - \frac{h}{2}]}^{[n \cdot d_Y + \frac{h}{2}]} \int_{[n \cdot d_X - \frac{w}{2}]}^{[n \cdot d_X + \frac{w}{2}]} I(x,y)\,dx\,dy \tag{14}$$

where:

P(m,n) is the total optical power sensed by element m,n in the camera array

I(x,y) is the intensity I(p) at point x,y (i.e. point p) in receive aperture as given by equation 1

By substituting equation 3 into equations 5 and 6 and combining with equation 1, the intensity at point x, y in the receive aperture is expressed in terms of the amplitude distribution $A(p_S)$ of the object. This combination contains a volume integral over the object from equation 3.

Substituting this resulting intensity pattern into equation 14 yields the net output of sensor m, n in the camera array. This contains an area integral in x, y over the sensor area, as well as a volume integral over the object.

The order of integration is reversed, doing the area integration first.

In doing this area integration, the magnitude $|S(p)|$ of the light distribution over the area of a single sensor is assumed constant and equal to its value at the center of the sensor. This approximation is justified since the center to center spacing x, y of the sensing areas must be small enough to satisfy the spatial sampling therein (i.e. at least two spatial samples per speckle). This is illustrated by the relative sizes of grated speckle pattern illustrated in FIG. 1B, and the sensor size illustrated in FIG. 1C.

Within the limits of this approximation, the following result is obtained:

$$P(m,n) = P_O + P_S(m,n) + P_n(m,n) + P_p(m,n) \tag{15a}$$

$$P_O = h \cdot w \cdot I_R \tag{15b}$$

$$P_S(m,n) = h \cdot w \cdot [|S[m \cdot d_X, n \cdot d_Y]|]^2 \tag{15c}$$

$$P_p(m,n) = \pi^2 \cdot h \cdot w \cdot \sqrt{I_R} \cdot \int |A[p_S]| \cdot \tag{15d}$$

$$e^{j[\phi[m,n,pS] - \phi R[m,n]]} \cdot F[\theta_x, \theta_y]\,dv$$

$$F[\theta_x, \theta_y] = \operatorname{sinc}\left[w \cdot \frac{k}{2 \cdot \pi} \cdot \sin[\theta_x]\right] \cdot \tag{15e}$$

$$\operatorname{sinc}\left[h \cdot \frac{k}{2 \cdot \pi} \cdot \sin[\theta_y]\right]$$

$$P_n(m,n) = [P_p(m,n)]^* = \text{complex conjugate of } P_p(m,n) \tag{15f}$$

$$\operatorname{sinc}(\alpha) \equiv \frac{\sin(\pi \cdot \alpha)}{\pi \cdot \alpha} \tag{15g}$$

where:

$A(P_S)$ = complex amplitude of point $P_S$ in object field $\phi(m,n,P_S)$ = phase shift of light in propagating from point $P_S$ in object field to detector m,n $\phi_R(m,n)$ = phase shift of light in propagating from virtual reference point to detector m,n $k_x, k_y$ = spatial frequency coordinates related to angle between object point and reference point as indicated in equation 2

Equation 15 summarizes the effect of the finite area of each detector. The measured power is weighted by the area w h of each detector. The finite sizes w and h in the two directions result in angular antenna patterns given by the two sinc functions of angle as shown in FIG. 4. The remaining phase term is simply the net phase at the center of the given detector m,n.

FIG. 4 shows the effect of the angular diffraction pattern on the object field. It is evident from this figure that the angular extent of the object field and reference point must be small enough that the sinc functions contain the scene of interest well within their main lobes as illustrated. Under these conditions, the effects of the finite area sensors and their corresponding antenna patterns are small and may generally be neglected.

These finite area samples are taken as approximations to samples at zero area points in the center of each sensing cell. Interpreting these samples as such, the spectra repeat at the sampling rates ad infinitum in both the x and y directions. This effect is sketched in FIG. 6. The spectra of the point samples are modified by the sinc function diffraction patterns as discussed above to account for the finite areas of the detectors.

In practice, the sensing areas can be made substantially contiguous so that the widths w and h are substantially equal to the center to center separations $d_X$ and $d_Y$ respectively.

$$d_X = w \quad (16a)$$

$$d_Y = h \quad (16b)$$

Under these conditions, the first nulls on the sinc patterns at $k \sin \Theta_x = 2\pi/w$ and $k \sin \Theta_y = 2\pi/h$ correspond to the sampling frequencies where the zero orders repeat at $2\pi/d_X$ and $2\pi/d_Y$ respectively. This is nominally the situation depicted in FIGS. 4 and 6.

Figure 6:
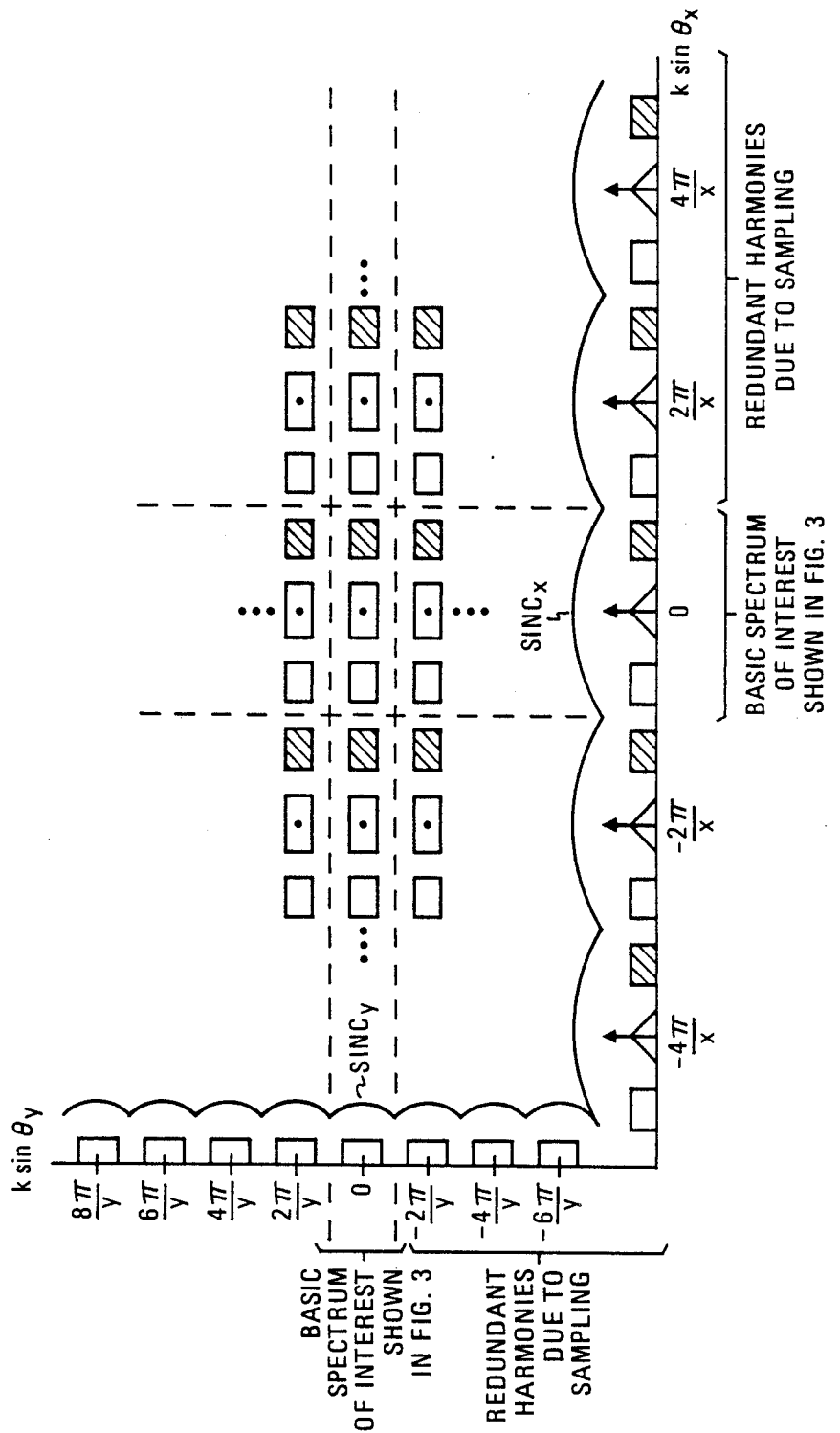
FIG. 6 illustrates the repeated two dimensional angular spectrum due to sampling of the outputs from successive sensors, useful in explaining the filtering requirement.

Summarizing, the area of each sensing cell must be small compared to the size of a speckle i.e. less than ¼. Under these conditions, the primary effect of the finite non zero size of the sensing area is to place the slight amplitude weighting on the object field. The resulting measurement made at each sensing site is considered as an approximation to a spatial point sample which leads to the classical repeated spectrum due to periodic sampling as shown in FIG. 6.

The total optical power detected by each sensing cell in the camera is given by equation 15. As discussed previously, the dominant term in this expression is $P_o$, while the much smaller term of interest is $P_p$.

To prevent the useful dynamic range of the camera output from being consumed by the large undesired bias term, this term is removed by taking the differences between adjacent cells in the x direction, and outputting this difference.

$$C(m,n) = P(m+1,n) - P(m,n) \quad (17)$$

where:

$C(m,n)$ = camera output sample m in x direction and n in y direction

In keeping with the nomenclature of equation 15, the following definitions are made and combined with equations 15 and 17.

$$C_S(m,n) = P_S(m+1,n) - P_S(m,n) \quad (18a)$$

$$C_n(m,n) = P_n(m+1,n) - P_n(m,n) \quad (18b)$$

$$C_p(m,n) = P_p(m+1,n) - P_p(m,n) \quad (18c)$$

$$C(m,n) = C_S(m,n) + C_n(m,n) + C_p(m,n) \quad (18d)$$

The large DC bias term $P_o$ does not appear in the above equations depicting the camera output. Thus, the dynamic range is utilized by meaningful data.

In the spatial frequency domain depicted by FIGS. 3, 4 and 6, this differencing process effectively removes the DC zero order impulse at the origin. The information of interest is limited to the shaded areas in the figures. This corresponds to $P_p$ in equation 15.

It is evident that any desired $P_p(m,n)$ can be obtained within a term that is constant with m (i.e. x direction) from an appropriate linear combination of various $C(m,n)$ outputs. Thus no significant information of interest has been lost in this differencing operation.

FIGS. 8A, 8B and 8C illustrate an arrangement for "differencing" in the camera. This may be considered to be the first stage of a Finite Impulse Response (FIR filter) operating on the sampled data.

The CTD camera may take several forms, it being essential to both efficient signal preamplification and to FIR filtering that the camera provide means for obtaining (N) signal differences between successive photodetectors in a row of (N+1) photo-detectors (i.e. $(P_1 - P_0, P_2 - P_1, P_3 - P_2 \ldots P_N - P_{N-1})$ where $P_i$ is the output of a photo-detector; the subscript "i" denoting its position in the row.

A suitable camera for this application is a Charge Injection Device (CID) having an array of typically 256×256 photo-detector sites subject to row read out as illustrated in FIGS. 8A, 8B and 8C.

Figure 9A:
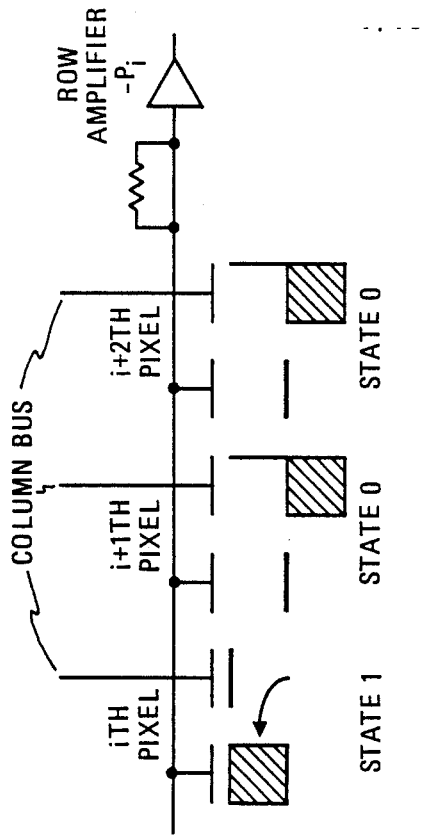
FIGS. 9A and 9B illustrate two stages of the read out process during which differencing takes place in the CID sensor of FIGS. 8A, 8B and 8C.
Figure 9B:
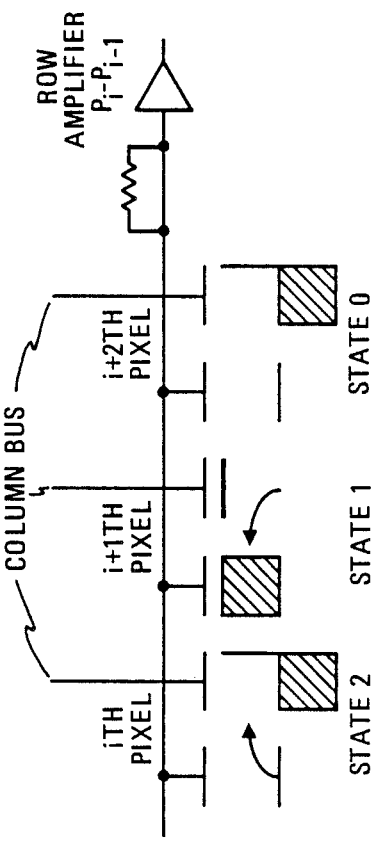

FIG. 8A shows the array in its entirety with FIG. 8B illustrating the detail of the internal gating at the lower two output R2, R4 ports of the vertical select scanner and when FIG. 8B is transposed (right to left) it provides the detail for the internal gating at the lower two output R2, R4 ports of the vertical select scanner. FIG. 8C shows the detail applicable to the first three ports at the left end of the horizontal scanner. This arrangement depicts a conventional row read out CID, as more fully set forth in U.S. Pat. Nos. 4,011,441, 4,084,257 and 4,241,421. These patents, which are hereby incorporated by reference, illustrate row read out operation and the taking of differences in a manner appropriate to the present embodiment. FIGS. 9A and 9B depict three pixels of the array during read out, FIG. 9B depicting read out at a later time. Each "pixel" of the CID contains two storage wells, one associated with a row line and the other with a column line. Readout takes place along row lines which connect to ports VEE and VEO which lead to even and odd row amplifiers (not illustrated). The charge transfer between row and column storage wells takes place as potentials to collapse the wells are applied to the columns suitably scanned by the horizontal scanner shown in FIG. 8A. During scanning of the array, following the injection of previously read out charge into the substrate, new charge accumulates and is stored in the column wells.

The read out which produces differences takes place in an essentially three step process best understood by reference to FIGS. 9A and 9B. The column well is designed to have twice the storage capacity of the row well to insure that the column well fills first and that the row well remains empty. This is the state "0" before read out. In FIG. 9A the $(i+1)^{th}$ and the $(i+2)^{th}$ pixels are in state "0", while in FIG. 9B only the $i+2^{th}$ pixel (only) is in state "0". The readout row takes place in a repeating two step process. In state one, a potential is applied to the $i^{th}$ column bus which collapses the $i^{th}$ column wells causing the photo induced charge to transfer to the row wells of the $i^{th}$ pixel as illustrated in FIG. 9A. At this instant, if the $i^{th}$ pixel is the first element in the row, a displacement current may be sensed in the row amplifier, due only to the photo induced charge on that column. This output, which is not differenced, may be discarded from the camera output.

FIG. 9B depicts the succeeding instant, in which the $i^{th}$ pixel now enters the second state. In the second state, the $(i+1)^{th}$ column wells are collapsed while the $i^{th}$ column wells are reestablished. This causes the photo induced charge of the pixel to move from the row well back to the column well, while the photo induced charge of the $(i+1)^{th}$ pixel moves from the column well to the row well. The net displacement charge at the input of the row amplifier is the photo induced charge of the second pixel minus that of the first pixel i.e. ($P_i - P_{i+1}$). At an instant later than that depicted in FIG. 9B, the $(i+2)^{th}$ column wells are collapsed while the $(i+1)^{th}$ column wells are reestablished, and the net displacement current on the row preamplifier is the photo induced charge of the $(i+2)^{th}$ pixel less that on the $(i+1)^{th}$ pixel, and so on, as the process is repeated along the row line.

The camera output can be processed to yield a spectrum similar to that depicted in FIG. 6, except that the DC impulse at the origin has been removed. The signal spectrum of interest can be described in terms of its spatial center frequency and bandwidth as follows.

$$k_{Ox} = k \cdot sin[\alpha_x] \tag{19a}$$

$$B_x = k \cdot \sin\left[\alpha_x + \frac{\beta_x}{2}\right] - k \cdot \sin\left[\alpha_x - \frac{\beta_x}{2}\right] \tag{19b}$$

where:

$k_{Ox}$ is the spatial carrier frequency in x direction at center of signal band $\alpha_x$ is the angle in x direction from reference point to center of target scene $B_x$ is the spatial frequency bandwidth in x direction of scene $\beta_x$ is the angle in x direction subtended by target scene of interest A similar condition exists in the y direction, except that there is no offset carrier in this case.

$$B_y = k \cdot \sin\left[\frac{\beta_y}{2}\right] + k \cdot \sin\left[\frac{\beta_y}{2}\right] = 2 \cdot k \cdot \sin\left[\frac{\beta_y}{2}\right] \tag{20}$$

where:

$B_y$ is the spatial frequency bandwidth in y direction of scene $\beta_y$ is the angle in y direction subtended by target scene of interest As seen in FIGS. 4 and 6, the basic spectrum of interest is comprised of the desired component in the upper band, an undesired base band spectrum, and an undesired conjugate spectrum in the low band. This basic spectrum repeats ad infinitum at the spatial sampling frequency rate as shown. The relationships between the center frequency, bandwidth, and sampling frequency dictate the separations between the desired and undesired portions of this spectrum.

Depending on the relative magnitude of the reference beam and signal object light at the camera receive aperture, there are two separate criteria for choosing these relationships.

In the typical case, the reference beam light can be made arbitrarily large with respect to the light from the object. Under these conditions, the term $P_s(m,n)$ in equation 15 can be made negligible compared to the other two terms. This corresponds to a negligible zero order term in the base band portion of the spectrum.

In this case, the desired spectrum and its undesired conjugate can be maximally separated by placing the center frequency at one quarter of the sampling rate.

$$k_{Ox} = \pi/2d_X \tag{21}$$

This constraint given by equation 21 results in the centers of the desired spectrum and its undesired conjugate being uniformly separated by $\pi/d_X$ throughout the sampled spectrum. This minimizes the demands of the subsequent filter which must isolate the desired spectrum.

The zero order term results from the convolution of the desired spectrum with itself. Thus it has a total two sided width equal to twice the signal bandwidth. Actual overlap of the desired spectrum with this undesired zero order term can thus be avoided by restricting the band of the desired signal to not exceed a quarter of the sampling frequency.

$$B_x < \pi/2d_X \tag{22}$$

Under these conditions, a guard band at least equal to the signal band exists between the signal spectrum and its undesired conjugate. Although no overlap exists with the undesired base band spectrum, there is no allowance for a guard band between it and the signal.

An alternate and considerably less likely operating condition involves a very strong light level from the object such that the reference beam cannot be made dominant without saturating the camera detectors. Under these conditions, the base band term would not be negligible and the center frequency should then be chosen to space the desired spectrum midway between the edges of the two undesired spectrums to facilitate filtering. This approach will now be fully discussed.

Since no filtering is required in the y direction, a significant guard band is not required between the desired spectra repeating in this direction. The only significant constraint is that overlap not occur. This results in the following limitation.

$$B_y < 2\pi/d_Y \tag{23}$$

Thus the spatial sampling rate dictates the maximum angular extent of the scene that can be accommodated without overlap from undesired extraneous terms present in the camera output.

However, suitable magnifying optics can be used to scale the spatial sampling rate existing on the camera face to any required sampling rate necessary to accommodate the actual angle subtended by the physical scene.

If the angular extent of the scene is the same in the vertical (y) and horizontal (x) directions and at its maximum allowable value, the sampling rate required in the horizontal direction is four times as high as that of the vertical direction.

$$B_x = B_y \tag{24a}$$

$$d_Y = 4 \cdot d_X \tag{24b}$$

Subsequent processing on the camera output can be implemented directly either without first passing through the FIR filter or with matched filtering of the scene. However, such implementations must operate on all of the spatial samples out of the camera. Since the scene only has a spatial bandwidth in the x direction which occupies one fourth of the available bandwidth, the sampling rate necessary to describe the scene is only one fourth of that available at the camera output.

Since the desired scene is complex, the samples required are also complex. The camera output consists of real samples, however, for which the sampling rate could be reduced to one fourth of the original rate if complex values were not involved. With complex values, the actual net data rate output of the camera can be reduced but only by a factor of two. This reduction in data rate is the primary reason for implementing the FIR filter, and permits the subsequent data processing software such as imaging, correlation, etc. to be operated at the reduced data rate.

The first step in reducing the data rate out of the camera is to filter its output so that just the desired spectrum in the upper band is passed while the lower and mid bands are suppressed. Thus the ideal filter should have a transfer function which is unity over this upper band and zero elsewhere. (No filtering is required in the y direction.)

After filtering, the final step in reducing the data rate out of the camera is decimation by four. Conceptually, this consists of resampling the filter output at a rate which is one fourth of the original rate. Practically, it means that only every fourth output of the FIR filter is evaluated. The effect of this decimation is to repeat the spectrum at the reduced sampling rate, with the resulting aliasing placing a replica of the desired signal spectrum centered at base H band (ranging from $-\pi/4d_x$ to $+\pi/4d_y$). Realistic FIR filters to approximate the ideal filter will now be discussed.

The ideal filter response to be synthesized as closely as practical should select one scaled area of the basic spectrum of interest illustrated in FIG. 6. Even though the input data is two dimensional, the desired filter is one dimensional. It acts independently on each consecutive camera scan line in the x direction.

The horizontal axis shown in the figure is in terms of angular spatial frequency, having units of radians per unit length.

For continuous input functions, linear filters are traditionally synthesized with the aid of the complex s variable. The locations of the poles and zeros of the filter transfer function in this complex s plane uniquely dictate the filter response, independently of the implementation details of the filter. The real and imaginary axis of this s plane are given as follows, for the angular spatial frequency discussed above.

$$s = \sigma + j \cdot k \cdot sin[\theta_x] \quad (25)$$

In dealing with discrete sampled data rather than continuous inputs, the required response becomes cyclic along the imaginary frequency axis of the s plane, extending ad infinitum. To cope with this situation, the following transformation from the s plane to a complex z plane is classically used.

$$z = e^{sx} \quad (26a)$$

$$z = e^{sx} \quad (26a)$$

$$z = e^{\sigma \cdot X} \cdot e^{j \cdot X \cdot k \cdot sin[\theta_x]} \quad (26b)$$

Thus the imaginary axis of the s plane (corresponding to $\sigma=0$) maps into a unit circle in the z plane (not to be confused with the spatial coordinate z the distance to the sensor plane). The origin in the s plane, along with all of the repetitions at multiples of the sampling frequency, map into the point z equals one in the z plane. The entire left hand portion of the s plane ($\sigma<0$) maps into the area inside the unit circle in the z plane, while the entire right hand portion of the s plane ($\sigma>0$) maps into the area outside of the unit circle in the z plane.

Thus the various spatial frequency zones shown on the horizontal axes of FIG. 6 are shown on arc segments of the unit circle in the z plane in FIG. 5. Filter synthesis, using this approach, consists of locating poles and zeros in this z plane such that the response is as close to unity over as much of the desired signal arc and as close to zero over the remaining arc as possible.

Linear sampled data filters consist essentially of adding a number of weighted samples to form a single output. The weights in general are complex, with complex inputs and outputs possible. A variety of configurations can be implemented, employing feedback if desired.

The number of sensing sites on a single horizontal scan line of the camera may be relatively small. This can cause edge effects at the beginning and end of a scan line to become significant if too many samples are used to obtain a single output. Thus it is desirable to minimize the number of samples processed for each output.

Figure 7A:
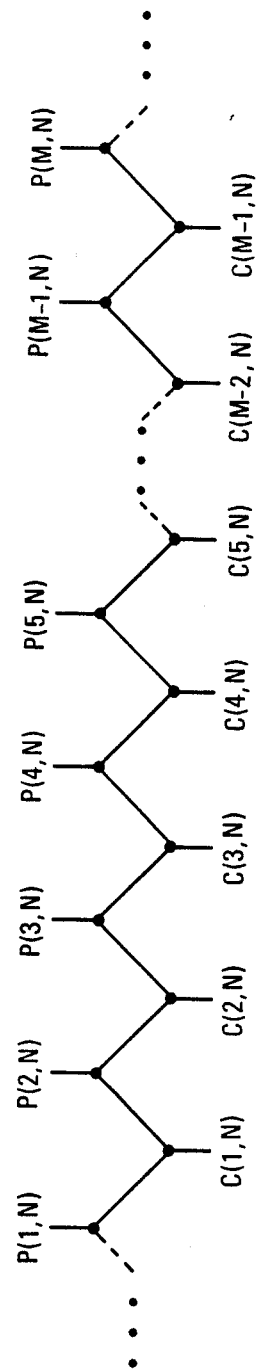
FIG. 7A is an equivalent circuit depiction of the "differencing" which takes place in the outputs of individual sensors on the sensor plane, and which is mathematically a part of a Finite Impulse Response (FIR) filter.
Figure 7B:
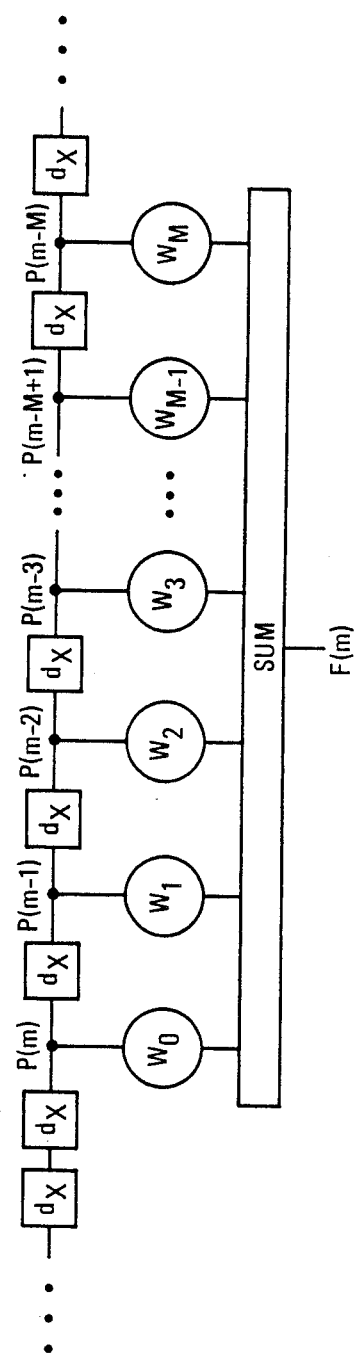
FIG. 7B is an equivalent circuit representation of the FIR filter required to select the desired complex spectrum and reject the undesired spectra; the representation optionally depicting both the differencing on the sensor plane and the external FIR filter or solely the external FIR filter.

The Finite Impulse Response (FIR) filter is ideal for this application. It consists simply of a weighted sum of a finite number of adjacent samples, as shown in FIG. 7B. There are a total of M+1 filter input samples ranging from P(m) through P(m-M), as shown in the figure. The samples are separated in space by the sampling interval $d_x$ as indicated.

This filter has the following output, as seen from its definition in the figure.

$$F(m) = \sum_{u}^{u=0...M} w_u \cdot P(m - u) \quad (27)$$

where:

F(m) is the filter output for position index m.

The z transform of a shifted parameter can be shown to be related to that of the unshifted parameter as follows.

Let $P_Z(z)$ denote the z transform of sequence p(m). Then $z^{-u}P_Z(z)$ becomes the z transform of shifted sequence P(m-u).

Using this to take the z transform of equation 27 leads to the following.

$$F_Z(z) = \sum_{u}^{u=0...M} w_u \cdot z^{-u} \cdot P_Z(z) \quad (28)$$

The filter transfer function is defined as the ratio of output over input as follows.

$$H(z) = \frac{F_Z(z)}{P_Z(z)} = \text{transfer function of filter} \quad (29)$$

Combining equations 28 and 29 and factoring leads to the following.

$$H(z) = \frac{1}{z^M} \cdot \sum_{u}^{u=0...M} w_u \cdot z^{M-u} \quad (30)$$

The summation consists of an M'th order polynomial whose coefficients are the complex weights $w_u$. In general this polynomial has M roots and can be factored into a form containing these roots leading to the following.

$$H(z) = \frac{1}{z^M} \cdot \prod_u^{u=1...M} [z - Z_u] \quad (31)$$

where:

$Z_u$ is the root of filter polynomial.

The desired frequency response stated in the H parameter transfer function is as follows:

$$H(\Omega) = e^{-jM\cdot\Omega} \cdot \prod_u^{u=1...M} [e^{j\cdot\Omega} - Z_u] \quad (32a)$$

$$\Omega = d_X \cdot k \cdot \sin[\theta_x] \quad (32b)$$

Equation 30 is the frequency response of the FIR filter shown in FIG. 7B and defined by equation 27. It is given in terms of the zeros of the filter polynomial.

The effect of the multiple poles at the origin is simply a linear phase shift, corresponding to the fixed pipeline delay necessary to fill the filter. The delay does not alter the shape of the magnitude characteristics or the frequency dispersion of the filter.

As previously discussed, the original sensor configuration has a large DC impulse at the origin. In terms of the sampled data FIR filter discussed in the previous section, this can be removed by a zero at z equal one. This filter and its frequency response are obtained directly from equations 30 and 32 as follows.

$$H_O(z) = 1 - z^{-1} \quad (33a)$$

$$H_O(\Omega) = e^{-j\cdot\Omega} \cdot [e^{j\cdot\Omega} - 1] \quad (33b)$$

$$H_0(\Omega) = 2 \cdot e^{-j[\frac{\Omega}{2} - \frac{\pi}{2}]} \cdot \sin\left[\frac{\Omega}{2}\right] \quad (33c)$$

where:

$H_O$ is the frequency response of filter with single zero at z equal one.

Equation 33a indicates that the implementation of this filter is simply the difference of adjacent samples, which is exactly the system implemented in the camera as previously discussed. Equation 33c indicates that the response tends to severely attenuate the undesired base band region of the spectrum without imposing a severe attenuation in the desired region of the signal spectrum of interest.

Thus the first step in filtering the sensor output is a single zero at z equal one as illustrated in FIG. 10A. This filter is implemented on the camera.

An additional filter effect occurring on the camera is that due to the finite area of the sensing sites. From equations 15d and 15e, this filter in the x direction is seen to be a sinc function with the argument (w k sin $\Theta_x$)/(2$\pi$). This argument is expressed as $(\Omega w)/(d_X 2\pi)$ by using equation 32b. This sinc function has its most dramatic effect as w gets as large as possible. (i.e. at w equal zero, the sinc function is unity for all $\Omega$ and has no effect.) In the limiting case, the maximum sensor width that w can realize is $d_X$, the center to center spacing. (See FIG. 1C). Thus in this limiting case, the sinc function filter due to finite sensor area has an argument $\Omega/(2\pi)$.

Combining this sinc function response due to finite area with the response given by equation 33c due to on camera differencing yields the following net response for all camera filtering.

$$H_C(\Omega) = e^{-j[\frac{\Omega}{2} - \frac{\pi}{2}]} \cdot \frac{\left[\sin\left[\frac{\Omega}{2}\right]\right]^2}{\frac{\Omega}{2}} \quad (34)$$

where:

$H_C(\Omega)$ is the net response of filtering on camera, including effect of finite area sensors and removal of DC bias by differencing adjacent sensor outputs.

The magnitude of this response is plotted in FIG. 10B.

The general filter transfer function is given by equations 31 and 32.

The magnitude of the response in db is obtained from these as follows.

$$H_{db}(\Omega) = \sum_u^{u=1...M} 20 \cdot \log[|e^{j\cdot\Omega} - Z_u|] \quad (35)$$

The primary task of the external filter is to attenuate the undesired conjugate spectrum as suggested in the complex z plane showing of FIG. 5. The simplest such filter has a single zero located in the center of the spectrum at z equal to $-j$. Such a filter would have a non-symmetrical response over the object of interest, attenuating the edge of the object nearer the reference point more than it attenuates the opposite edge of the scene.

This effect can be mitigated by placing an additional zero at $Z = -1$, to balance the zero at $Z = +1$. This results in a more symmetrical pass band containing the object of interest.

The filter design, which will now be further discussed, assumes that the object of interest is restricted to one quarter of the available angular space that is unambiguously sampled as shown in FIGS. 5 and 6, and that the reference beam light dominates the light from the total object by a sufficient amount that the effects of the base band light are negligible for any intended application of this system.

Under these conditions the spatial frequency bands of $\Omega$ ranging from $-\pi$ to $-3\pi/4$, from $-\pi/4$ to $+\pi/4$ and from $3\pi/4$ to $\pi$, contain no energy. Thus the filter response in these bands is of no concern. Therefore zero locations are more fruitful if placed within the stop band of interest ranging from $\Omega$ equal $-\pi/4$ to $-3\pi/4$.

Using these guidelines, the simple implementation of multiple zeros at z equals $-j$ is a very effective design. FIGS. 11 and 12 shows such a design with the spectral aliasing resulting from decimation by two.

Figure 13:
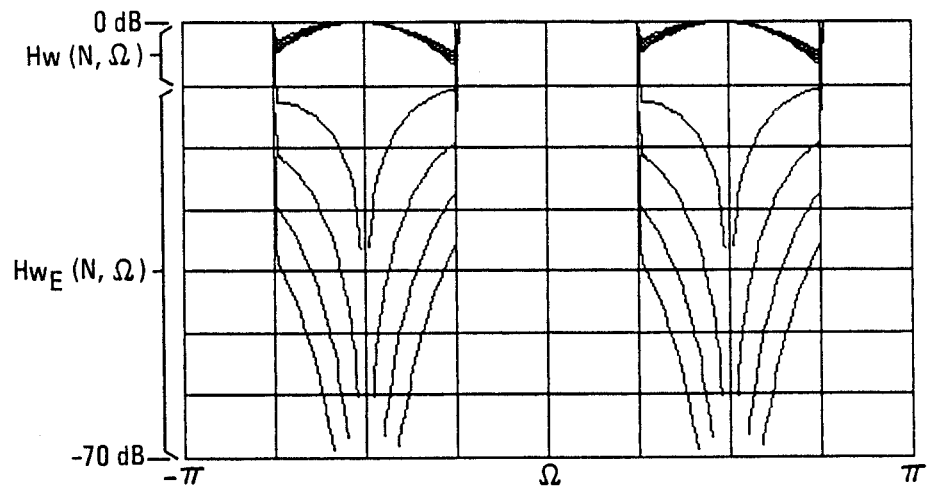
FIG. 13 illustrates the net frequency response of the same exemplary embodiment, assuming negligible energy at the central base band.

Adhering to the hypotheses that there is no significant energy in the central band or edge band, the response shown in FIG. 13 is equivalent to that of FIG. 12 over the regions of interest. Decimating this filter by two (total decimation by four from the original sampling frequency) the response of FIG. 13 aliases the desired band into the central base band region yielding the final desired result. This is shown in FIG. 14.

Figure 14:
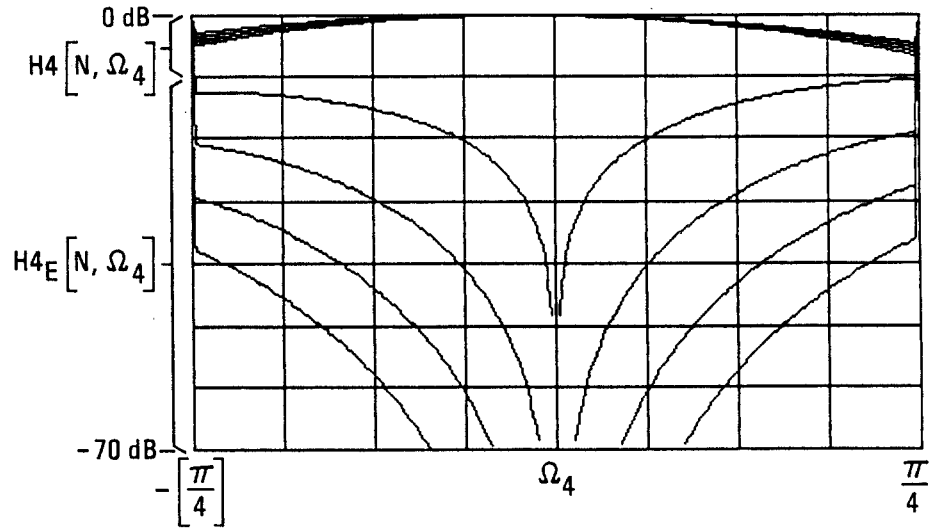
FIG. 14 illustrates the net frequency response of an exemplary embodiment having the Z plane zero locations of FIG. 11, and providing an additional decimation by two (four altogether)

The horizontal scale of FIG. 14 is expanded from that of FIG. 13 and the angular ordinate is renamed as indicated. The new ordinate is zero at the center of the scene.

The original sampling frequency is chosen as four times that required by the angular extent of the scene of interest. The reference point is placed at nominally the same range as that to the target scene of interest, and at an angle from the center of the scene that equals the angular extent of the scene. The reference beam intensity is made to dominate by several orders of magnitude over the net intensity from the total scene at any point in the receive aperture. Under these conditions, the external FIR filter is designed to have a single zero at z equal $-1$, and multiple zeros at z equal $-j$.

The net response of this system, including the effect of the on camera differencing and the finite area of the sensors, is thus shown in FIG. 14. This consists of two components. The desired component is relatively flat across the band of interest, having a monotonic shading with less than ten db attenuation at the extreme band edges. The undesired component due to aliasing of the suppressed conjugate spectrum has zero response at the band center and increases monotonically toward the band edges.

Figure 15:
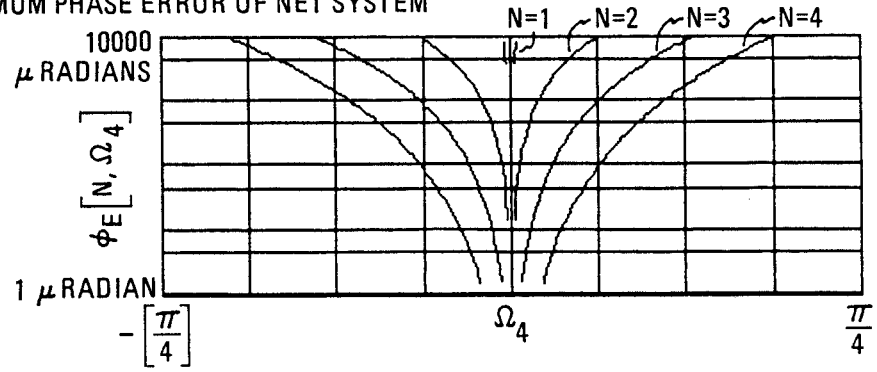
FIG. 15 is a graph of the maximum phase error against angular spatial frequency of the exemplary embodiment whose system response is characterized in FIG. 14.

FIG. 14 contains a plot of the magnitude response of the system along with a plot of the maximum magnitude error in the system output. FIG. 15 contains a plot of the magnitude of the maximum phase error in the system output. These plots summarize the system performance under the operating conditions previously noted.

The FIR filter, having the preferred performance for the objects of the present invention, has the zero pattern shown in FIG. 11. As previously noted, the zero at z equal one is due to the processing internal to the camera and the external filter provides the zeros at $Z=-1$ and multiple zeros at $Z=-j$.

The following weights lead to the net system responses shown in FIG. 14. They correspond to the external portion of the FIR filter shown in FIG. 7B. These weights are not unique since many different weight sets can result in the same pole - zero pattern in the Z plane. Multiplying these weights by an arbitrary complex constant $(A+jB)$ results in the same filter function except for an inconsequential amplitude change and phase shift.

| N = 1 | N = 2 |
| --- | --- |
| W(N,n) | W(N,n) |
| W(1,0) = 0.177 − 0.177j | W(2,0) = −0.125j |
| W(1,1) = 0.354 | W(2,1) = 0.25 − 0.125j |
| W(1,2) = 0.177 + 0.177j | W(2,2) = 0.25 + 0.125j |
|  | W(2,3) = 0.125j |
| N = 3 | N = 4 |
| W(N,n) | W(N,n) |
| W(3,0) = −0.044 − 0.044j | W(4,0) = −0.031 |
| W(3,1) = 0.088 − 0.177j | W(4,1) = −0.031 − 0.125j |
| W(3,2) = 0.265 | W(4,2) = 0.188 − 0.125j |
| W(3,3) = 0.088 + 0.177j | W(4,3) = 0.188 + 0.125j |
| W(3,4) = −0.044 + 0.044j | W(4,4) = −0.031 + 0.125j |
|  | W(4,5) = −0.031 |

As explained in connection with expression (13), the FIR filter may produce an imperfect reconstruction of the object field until its phase is corrected by subtracting an additional phase shift having the value of $k\, r_R(p, p_R)$.

However, such a phase correction is exactly that which results from placing a negative lens at the receive aperture and having a focal length equal to the range from the reference point to the aperture. When imaging is implemented in computer software, the equivalent of an additional lens is required to perform the imaging. The single lens equivalent of the imaging lens and the phase correcting lens can be used to perform both functions in a single implementation.

An alternate way of viewing the matter is to consider the undesired phase component given by equation 13 as being equivalent to that caused by a positive lens at the receive aperture. This hypothetical positive lens has a focal length equal to the range from the reference point to the receive aperture. As such, the scene is at the focal plane of the lens so that a virtual image of the scene is formed at infinity. The reference point also appears to be at infinity so that all wavefronts are nominally collimated, leading to the uniform straight line fringes produced.

From this viewpoint, it is evident that the uncorrected hologram corresponds to viewing the equivalent scene through an appropriate positive lens. The effect of this hypothetical positive lens can be removed by the software equivalent of the appropriate negative lens at the receive aperture. Alternatively, the negative lens can be omitted and any subsequent software imaging lens equivalent can be designed by assuming that the original scene was viewed through a positive lens.

Summarizing, subsequent filtering by a FIR filter following the camera is needed to suppress the undesired components and yield the desired term. This desired term is the complex amplitude distribution which would result from viewing the scene through a hypothetical positive lens at the receive aperture. The focal length of this hypothetical lens is such that a virtual image of the reference point appears at infinity. No such lens actually exists. Its apparent effect is the result of placing the reference point at nominally the same range from the receive aperture as the range to the object. This selection of the reference point position has the significant advantage earlier outlined of improving the efficiency of the sampling performed by the photo sensors. This advantage ordinarily outweights another selection, as for instance placing the reference beam at infinity.

The preferred configuration of the sensors shown in FIG. 1C is one in which the individual sensing regions are 4 units in the Y dimension by 1 in the X dimension, the sensors being at approximately lambda/4 intervals along the X dimension at the spatial frequencies of the speckle fringes. This aspect ratio is efficient in that equal spatial resolution is provided in both the X and Y dimensions with the region shared by four sensors used to sample a single speckle being conveniently square. One may use a larger number of sensors (e.g. 5 or 7) for greater accuracy in the magnitude and phase determinations as earlier discussed) in which case it is generally convenient to retain the same aspect ratio for the individual sensing regions.

The FIR filter may also be carried out in a large number of different ways depending largely upon the system requirements. The approach using complex weights assigned to produce an nth order zero (where "n" is 1 to 4) at $Z=-j$ on the negative imaginary axis is accordingly intended to be exemplary. One could employ other more even distributions of the "zeros" for elimination of the undesired terms.

The block diagram of the electronic holographic apparatus may take the form illustrated in FIG. 1A, in which the final output is an image. The necessary apparatus includes (usually an A/D converter 24) a FIR filter 25 and decimation block 26 preceding a Fresnel/-Fourier transformer 27 which reconstructs an image suitable for direct application to display 28. The processing capacity demanded of the F/F transformer 27 is high, particularly with arrays having larger element counts. In many applications, imaging may not be required, and the processor output may be taken directly from the output of the FIR filter-decimation block (25-26), at which the extraneous terms have been removed and only the desired positive spatial frequency term is present. In some non-imaging applications, the output of the camera may be taken without conversion to digital format, and without "FIR" filtering. For instance in interferometry, matched filtering, or correlation applications, one would still require differencing, preferably on the sensor plane, to reduce or eliminate the large spectral term of uniform value.

What is claimed is:

1. Apparatus for sensing the hologram of a three dimensional object field with plural resolution elements comprising:
   A. means for producing mutually coherent optical illuminating and reference beams,
      (1) the illuminating beam illuminating the object field to cause the light reflected from the object field to impinge upon a bounded planar sensing region to form a pattern of speckles,
      an X, Y, Z coordinate system having an origin at the center of said sensing region, the Z axis thereof passing through the center of said object field, with the X and Y axes passing through said origin and lying in said sensing region;
      (2) the reference beam illuminating said sensing region from a virtual point source at a virtual position displaced to one side of the object field, said origin, the center of said object field and the virtual position of said reference point defining a plane intersecting said sensing region in a line defining the X axis, a line perpendicular thereto defining the Y axis,
      the arrangement creating a linear superposition of sinuosoidal fringes upon the pattern of speckles incident upon said sensing region, the fringes in all speckles being substantially parallel to the Y axis and of independent phase and amplitude,
      said reference source position and the center of the object field having an angular separation, measured at said origin, creating on the average at least one dark region and one light region per speckle; and
   B. a camera having
      (1) an aperture forming the boundary of said sensing region, said aperture permitting resolution of separate elements of the object field at the camera, and
      (2) an array of optical detectors which are periodically sampled responding as square law devices to the incident light to produce cross product terms when impinged on by multiple sources, said optical detectors being disposed in said sensing region and arranged in rows and columns, the rows thereof being parallel to said X axis and the columns thereof being parallel to said Y axis,
      (3) means to image said speckles upon said detectors with sufficient magnification such that on the average, a full wave (a dark and a light region) of a fringed speckle impinges on a plurality of detectors in a row and at least one detector in a column, the number of detectors in said plurality being sufficient to determine unambiguously the amplitude and the spatial phase of the fringe, and
      (4) means for processing the sampled outputs of said detectors to obtain an electrical signal representing the spatial phases and amplitudes of the speckles for sensing the hologram.

2. The apparatus set forth in claim 1 wherein
said virtual reference point and the center of said object field are disposed at substantially the same Z coordinate to cause the fringes in all speckles to be of substantially equal spatial frequencies, and
said detectors are spaced at equal intervals along said rows for efficient phase and amplitude measurement.

3. The apparatus set forth in claim 1, wherein
said illuminated object field and said reference beam produce a spatial spectrum over said bounded planar region giving rise to four spatially superimposed terms in the sampled detector outputs; said terms including
a spectral term of uniform value due to illumination by said reference beam,
a spectral term of the speckle pattern due to said illuminated object field,
an unwanted negative spatial frequency spectral term corresponding to the conjugate term of the cross product due to light from the illuminated object field and the reference beam,
and a desired positive spatial frequency spectral term corresponding to the direct term of the cross product due to light from the illuminated object field and the reference beam,
said virtual reference point being displaced from said Z axis at an angle ($\Theta_o$) greater than the angle subtended by said object field at said origin to cause said four terms although spatially superimposed over the aperture to be distributed in the spatial frequency spectral domain in mutually separated positions.

4. The apparatus set forth in claim 3 wherein
means are provided to isolate the desired positive spatial frequency cross-product spectral term from the other terms in said sampled detector outputs.

5. The apparatus set forth in claim 4 wherein:
said means to isolate the desired positive spatial frequency cross-product spectral term includes means for subtractively combining the sampled outputs of successive detectors in each row to obtain an $(n-1)$ fold set of output differences ($P_1-P_0$; $P_2-P_1$; $P_3-P_2$;—$P_n-P_{n-1}$), where P denotes the signal from a photo-detector, the subscript denoting its position in a row of n photo-detectors,
said substractive combination constituting a spatially selective first Finite Impulse Response (FIR) filter for eliminating from said sampled detector outputs said spectral term of uniform value and a substantial portion of the spectral term of the speckle pattern.

6. The apparatus set forth in claim 5 wherein
said subtractive combination of sampled detector outputs is achieved by interconnections monolithically integrated with said photo-detectors on said sensor plane.

7. The apparatus set forth in claim 6 wherein:
said means to isolate the desired positive spatial frequency cross-product spectral term includes means for setting the intensity of the reference beam high in relation to the intensity of the illumination reflected from the object field over said sensing region to make said spectral term of the speckle pattern negligibly small in relation to the desired positive frequency cross-product spectral term.

8. The apparatus set forth in claim 7, having in addition thereto, a second Finite Inpulse Response (FIR) filter to which said sequence of output differences in sampled detector outputs is coupled for removing said undesired negative frequency cross-product spectral term.

9. The apparatus set forth in claim 8 wherein:

each optical detector is spaced along a row (i.e. the X coordinate) at $\pi/2$ radians of the spatial frequency of said fringes, each set of four adjacent optical detectors in the same row occupying a substantially square area within said array.

10. The apparatus set forth in claim 8 wherein said second FIR filter comprises a network having an M-fold plurality of serially connected nodes, where M is a digit having a value from 3 to 6 inclusive, to which successive sets of M output differences in sampled detector outputs are sequentially supplied, M complex multipliers each connected to a node for multiplication of the output difference present at the node by a fixed complex multiplicative weight, said resulting complex weights being chosen to select said desired positive spatial frequency cross-product term and reject said undesired negative spatial frequency cross-product term, and a summer connected to the outputs of said multipliers for forming a single output sample for each set of m output differences.

11. The apparatus set forth in claim 10 wherein:

analog to digital conversion means are provided to convert the sampled detector outputs applied to said second FIR filter to a digital form.

12. The apparatus set forth in claim 11 wherein:

said second FIR filter has three nodes, to which said output sample differences are supplied from successively selected sets of four adjacent detectors, and three complex multipliers.

13. The apparatus set forth in claim 12 wherein:

in a complex Z plane representation of said second FIR filter, the complex weights are assigned to produce an $n^{th}$ order zero at $Z = -j$ on the negative imaginary axis where n=1 to 4 and a zero at $Z = -1$;

a zero at $Z = +1$ on the positive real axis being achieved by said subtractive combinations.

14. The apparatus set forth in claim 13 wherein the outputs of said second FIR filter are subject to decimation by a factor of 4 to reduce the data rate.

15. The apparatus set forth in claim 14 wherein:

the complex weights for a first order zero at the negative imaginary axis are proportional to:

$W_1 = 0.177 - 0.177j$ $W_2 = 0.354$ $W_3 = 0.177 + 0.177j.$

16. The apparatus set forth in claim 11 wherein:

said second FIR filter has four nodes, to which differences are supplied from five adjacent detectors, and four complex multipliers.

17. The apparatus set forth in claim 16 wherein:

in a complex Z plane representation of said second FIR filter, the complex weights are assigned to produce a zero at $Z = +1$ on the positive real axis, a zero at $Z = -1$ on the negative real axis, and a second order zero at $Z = -j$ on the negative imaginary axis.

18. The apparatus set forth in claim 17 wherein:

the complex weights for a second order zero at the negative imaginary axis are proportional to:

$W_1 = -0.125j$ $W_2 = 0.25 - 0.125j$ $W_3 = 0.25 + 0.125j$ $W_4 = 0.125j.$

19. The apparatus set forth in claim 11 wherein:

said second FIR filter has five nodes, to which differences are supplied from six adjacent detectors, and five complex multipliers.

20. The apparatus set forth in claim 19 wherein:

in a complex Z plane representation of said second FIR filter, the complex weights are assigned to produce a zero at $Z = +1$ on the positive real axis, a zero at $Z = -1$ on the negative real axis, and a third order zero at $Z = -j$ on the negative imaginary axis.

21. The apparatus set forth in claim 20 wherein:

the complex weights for a third order zero at the negative imaginary axis are proportional to:

$W_1 = -0.044 - 0.044j$ $W_2 = 0.088 - 0.177j$ $W_3 = 0.265$ $W_4 = 0.088 + 0.177j$ $W_5 = -0.044 + 0.044j.$

22. The apparatus set forth in claim 11 wherein:

said second FIR filter has six nodes, to which differences are supplied from seven adjacent detectors, and six complex multipliers.

23. The apparatus set forth in claim 22 wherein:

in a complex Z plane representation of the filter, the complex weights are assigned to produce a zero at $Z = +1$ on the positive real axis, a zero at $Z = -1$ on the negative real axis, and a fourth order zero at $Z = -j$ on the negative imaginary axis.

24. The apparatus set forth in claim 23 wherein:

the complex weights for a fourth order zero at the negative imaginary axis are proportional to:

$W_1 = -0.031$ $W_2 = -0.031 - 0.125j$ $W_3 = 0.188 - 0.125j$ $W_4 = 0.188 + 0.125j$ $W_5 = -0.031 + 0.125j$ $W_6 = -0.031$.

25. Electronic holographic apparatus comprising:
A. means for producing mutually coherent optical illuminating and reference beams,
   (1) the illuminating beam illuminating an object field to cause the light reflected from the object field to impinge upon a bounded planar sensing region to form a pattern of speckles,
   (2) the reference beam illuminating said sensing region from a virtual reference source position displaced to one side of the object field,
the arrangement creating a linear superposition of sinuosoidal fringes upon the pattern of speckles incident upon said sensing region, the fringes in all speckles being substantially parallel and of independent phase and amplitude,
said reference source position and the center of the object field having an angular separation, measured from the center of said sensing region, creating on the average at least one dark region and one light region per speckle; and
B. a camera having
   (1) an aperture forming the boundary of said sensing region, said aperture permitting resolution of separate elements of the object field at the camera, and
   (2) an array of optical detectors, the outputs of which are periodically sampled, responding as square law devices to the incident light to produce cross product terms when impinged on by multiple sources, said optical detectors being disposed in said sensing region and arranged in rows and columns, the rows thereof being perpendicular to said fringes and the columns thereof being parallel to said fringes,
   (3) means to image said speckles upon said detectors with sufficient magnification such that on the average, a full wave (a dark and a light region) of a fringed speckle impinges on a plurality of detectors in a row, the number of detectors in said plurality being sufficient to determine unambiguously the amplitude and the spatial phase of the fringe, and
   (4) means for processing the sampled outputs of said detectors to obtain an electrical signal representing the spatial phases and amplitudes of the speckles representing a hologram of the object field.

26. The apparatus set forth in claim 25, wherein
said illuminated object field and said reference beam produce a spatial spectrum over said sensing region giving rise to four spatially superimposed terms in the sampled detector outputs; said terms including
a spectral term of uniform value due to illumination by said reference beam,
a spectral term of the speckle pattern due to said illuminated object field,
an unwanted negative spatial frequency spectral term corresponding to the conjugate term of the cross product due to light from the illuminated object field and the reference beam,
and a desired positive spatial frequency spectral term corresponding to the direct term of the cross product due to light from the illuminated object field and the reference beam,
said virtual position of the reference beam being displaced from the center of the object field at an angle ($\Theta_o$) at the center of said sensing region greater than the angle subtended by said object field to cause said four terms although spatially superimposed over the aperture to be distributed in the spatial frequency spectral domain in mutually separated positions.

27. The apparatus set forth in claim 26 wherein
said virtual reference source is a virtual point source, the center of said object field and said virtual reference point being disposed at substantially the same distance from the plane of said bounded planar region to cause the fringes in all speckles to be of substantially equal spatial frequencies, and
said detectors are spaced at equal intervals along said rows for efficient phase and amplitude measurement.

28. The apparatus set forth in claim 27 wherein
means are provided to isolate the desired positive spatial frequency cross-product spectral term from the other terms in said sampled detector outputs.

29. The apparatus set forth in claim 28 wherein:
said means to isolate the desired positive spatial frequency cross-product spectral term includes means for subtractively combining the sampled outputs of successive detectors in each row to obtain an $(n-1)$ fold set of output differences ($P_1 - P_0$; $P_2 - P_1$; $P_3 - P_2$; $—P_n - P_{n-1}$), where P denotes the signal from a photo-detector, the subscript denoting its position in a row of n photo-detectors,
said subtractive combination acting as a spatially selective Finite impulse response (FIR) filter for eliminating said spectral term of uniform value and a substantial portion of the spectral term of the speckle pattern from the camera output.

30. The apparatus set forth in claim 29 wherein:
said means to isolate the desired positive spatial frequency cross-product spectral term includes means for setting the intensity of the reference beam high in relation to the intensity of the illumination reflected from the object field over said sensing region to make said spectral term of the speckle pattern negligibly small in relation to the desired positive frequency cross-product spectral term.

31. The apparatus set forth in claim 30, having in addition thereto,
a finite input response (FIR) filter to which said sequence of output differences in sampled detector outputs is coupled for removing said undesired negative frequency cross-product spectral term.

* * * * *